(12) United States Patent
Inagaki

(10) Patent No.: US 12,135,519 B2
(45) Date of Patent: Nov. 5, 2024

(54) POWER SUPPLY APPARATUS AND IMAGE FORMING APPARATUS

(71) Applicant: CANON KABUSHIKI KAISHA, Tokyo (JP)

(72) Inventor: Masaki Inagaki, Shizuoka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 248 days.

(21) Appl. No.: 17/834,379

(22) Filed: Jun. 7, 2022

(65) Prior Publication Data

US 2022/0413422 A1 Dec. 29, 2022

(30) Foreign Application Priority Data

Jun. 29, 2021 (JP) ................................ 2021-107930

(51) Int. Cl.
*H02M 3/335* (2006.01)
*G03G 15/00* (2006.01)

(52) U.S. Cl.
CPC ......... *G03G 15/5004* (2013.01); *G03G 15/80* (2013.01); *H02M 3/33569* (2013.01)

(58) Field of Classification Search
CPC ... G03G 15/5004; G03G 15/80; H02M 3/335; H02M 3/33507; H02M 1/0032; H02M 1/0035; H02M 3/33569
See application file for complete search history.

(56) References Cited

U.S. PATENT DOCUMENTS

2002/0186571 A1* 12/2002 Tsuge .................. H02M 3/3385
363/21.01
2017/0176918 A1* 6/2017 Shimura ............ G03G 15/5004

FOREIGN PATENT DOCUMENTS

| JP | 2015-192482 A | 11/2015 |
| JP | 2017-112798 A | 6/2017 |
| JP | 2020-61799 A | 4/2020 |
| JP | 67-00772 B2 | 5/2020 |

OTHER PUBLICATIONS

U.S. Appl. No. 17/734,557, filed May 2, 2022, by Mitsunori Oshima et al.

* cited by examiner

*Primary Examiner* — Gary L Laxton
(74) *Attorney, Agent, or Firm* — VENABLE LLP

(57) ABSTRACT

A power supply apparatus including a switching element configured to supply or cut off electric power to a primary coil of a transformer by a switching operation, and a control unit configured to control the switching operation. The control unit is configured to perform intermittent control of repeating a switching period for performing the switching operation and a stop period for stopping the switching operation. In the switching period, when the control unit performs the switching operation a predetermined number of times, the switching period is transitioned to the stop period. In the stop period, when the control unit determines that a voltage output from a secondary coil of the transformer falls below a target voltage, the stop period is transitioned to the switching period. The control unit is configured to change the switching operation based on a length of the stop period.

19 Claims, 13 Drawing Sheets

POWER SUPPLY APPARATUS AND IMAGE FORMING APPARATUS

BACKGROUND OF THE INVENTION

Field of the Invention

The present invention relates to a power supply apparatus which converts an AC (alternate-current) voltage input from a commercial AC power supply or the like into a DC (direct-current) voltage, and an image forming apparatus including a power supply apparatus.

Description of the Related Art

In a switching power supply apparatus which converts an AC voltage input from a commercial AC power supply or the like into a DC voltage, there has been known switching control performed in accordance with a state of a load to which electric power is supplied. That is, it has been known that, in the switching power supply apparatus, continuous switching control is performed in a high load state in which the electric power supplied to the load is large, and intermittent switching control is performed in order to improve a power supply efficiency in a low load state in which the electric power supplied to the load is small. Moreover, for example, in a switching power supply apparatus as described in Japanese Patent No. 6700772, when the intermittent switching control is performed, a feedback (FB) voltage is referred to, and when the FB voltage becomes equal to or higher than a predetermined voltage, a switching operation is started from a state in which the switching operation is stopped.

In the switching power supply apparatus, in order to perform switching control having a high power supply efficiency, it is required to highly accurately detect a state of the load to which the electric power is supplied. For example, of switching power supply apparatus, there is known a power supply apparatus which detects the load state on a secondary side based on a current flowing through a resistor connected to a primary coil of a transformer. However, a value of the current flowing through the resistor is greatly different between the high load state in which the power supplied to the load is large and the low load state in which the power supplied to the load is small. Accordingly, a range switching circuit for switching a resistance value in accordance with the load state to switch a detection range is required to highly accurately detect the load state. Thus, there is desired a switching power supply apparatus which can highly accurately detect the load state, has a high power supply efficiency, and is inexpensive.

SUMMARY OF THE INVENTION

The present invention has been made in view of the above-mentioned circumstance, and has an object to efficiently supply electric power in accordance with a load state without adding a new circuit.

In order to achieve the above-mentioned object, according to an embodiment of the present invention, there is provided a power supply apparatus, comprising: a transformer including a primary coil, a secondary coil, and an auxiliary coil; a switching element configured to supply or cut off electric power to the primary coil by a switching operation; a control unit configured to control the switching operation; and a feedback unit configured to feed back a voltage output from the secondary coil, wherein the control unit is configured to perform an intermittent control of repeating a switching period for performing the switching operation and a stop period for stopping the switching operation, wherein the control unit includes a measurement portion configured to measure a length of the stop period, wherein in the switching period, when the control unit performs the switching operation of the switching element a predetermined number of times, the switching period is transitioned to the stop period, and in the stop period, when the control unit determines, based on a voltage output from the feedback unit, that the voltage output from the secondary coil falls below a target voltage, the stop period is transitioned to the switching period, and wherein the control unit is configured to change the switching operation of the switching element in the switching period based on the length of the stop period measured by the measurement portion.

According to an embodiment of the present invention, there is provided an image forming apparatus, comprising: an image forming portion configured to form an image on a recording material; a controller configured to control the image forming portion; and a power supply apparatus configured to supply electric power to the image forming portion and the controller, wherein the controller is configured to control the image forming portion to be switchable among a print state for forming the image on the recording material, a standby state of being ready to transition to the print state, and a sleep state for reducing power consumption, and wherein the power supply apparatus includes: a transformer including a primary coil, a secondary coil, and an auxiliary coil; a switching element configured to supply or cut off electric power to the primary coil by a switching operation; a control unit configured to control the switching operation; and a feedback unit configured to feed back a voltage output from the secondary coil, wherein the control unit is configured to perform an intermittent control of repeating a switching period for performing the switching operation and a stop period for stopping the switching operation, wherein the control unit includes a measurement portion configured to measure a length of the stop period, wherein in the switching period, when the control unit performs the switching operation of the switching element a predetermined number of times, the switching period is transitioned to the stop period, and in the stop period, when the control unit determines, based on a voltage output from the feedback unit, that the voltage output from the secondary coil falls below a target voltage, the stop period is transitioned to the switching period, and wherein the control unit is configured to change the switching operation of the switching element in the switching period based on the length of the stop period measured by the measurement portion.

Further features of the present invention will become apparent from the following description of exemplary embodiments with reference to the attached drawings.

DESCRIPTION OF THE EMBODIMENTS

Now, detailed description is made of embodiments of the present invention with reference to the drawings.

First Embodiment

[Configuration of Image Forming Apparatus]

Figure 1:
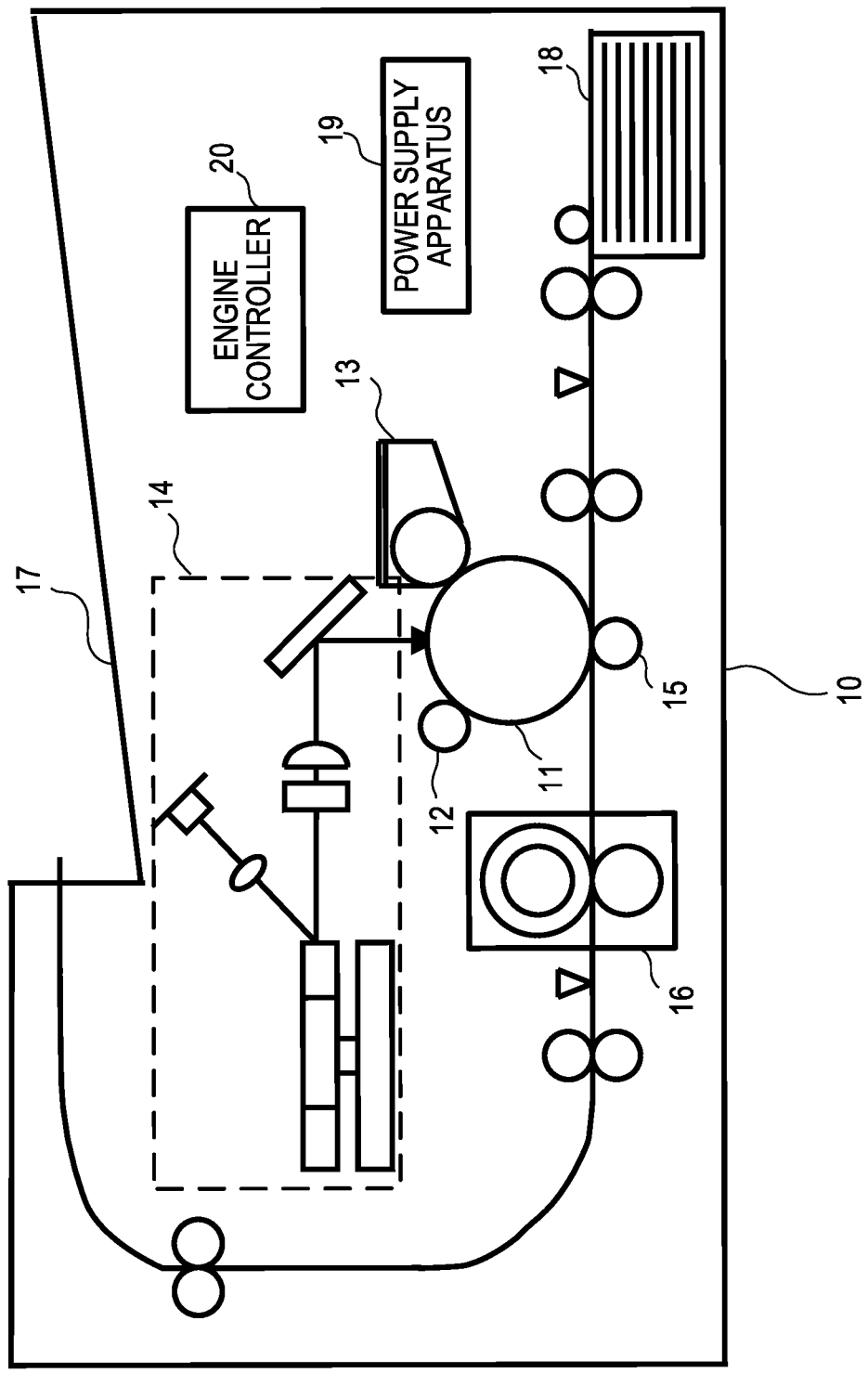
FIG. 1 is a diagram for illustrating a configuration of a laser beam printer in a first embodiment to a fourth embodiment.

FIG. 1 is a schematic cross-sectional diagram for illustrating a configuration of a laser beam printer as an example of an image forming apparatus. A laser beam printer 10 (hereinafter referred to as "printer 10") includes a photosensitive drum 11, a charging portion 12 which charges the photosensitive drum 11 at uniform electric potential, and an exposure device 14 which irradiates the photosensitive drum 11 with laser light to form an electrostatic latent image on a surface of the photosensitive drum 11. Moreover, the printer 10 includes a developing portion 13 which causes toner to adhere to the electrostatic latent image formed on the photosensitive drum 11 to develop the electrostatic latent image, to thereby form a toner image. In the printer 10, the toner image formed on the photosensitive drum 11 is transferred, by a transfer portion 15, to a sheet (not shown) being a recording material fed from a cassette 18. The sheet having the toner image transferred thereon is conveyed to a fixing device 16. In the fixing device 16, the toner image is heated and pressed, thereby being fixed to the sheet. The sheet having the toner image fixed thereto is discharged to a tray 17. An image forming portion which forms the image on the sheet is formed of the photosensitive drum 11, the charging portion 12, the developing portion 13, and the transfer portion 15.

Moreover, the printer 10 includes a power supply apparatus 19. The power supply apparatus 19 supplies electric power to drive portions such as motors and an engine controller 20. The engine controller 20 being a controller includes a CPU (Central Processing Unit) (not shown) and a nonvolatile memory (not shown). The CPU controls an image forming operation by the image forming portion, a conveying operation for the sheet, and the like in accordance with a control program stored in the nonvolatile memory. When a print operation being a print state in which the image is formed on the sheet is finished, the engine controller 20 causes the printer 10 to transition to a standby state in which the printer 10 is ready to transition to the print state. Further, after a predetermined period has elapsed since the transition to the standby state, the engine controller 20 causes the printer 10 to transition to a sleep state being an energy saving mode in order to reduce power consumption at the time when the printer 10 is on standby. As described above, the printer 10 has three states including the sleep state, the standby state, and the print state. The engine controller 20 can switch the printer 10 to each state.

[Configuration of Power Supply Apparatus]

Figure 2:
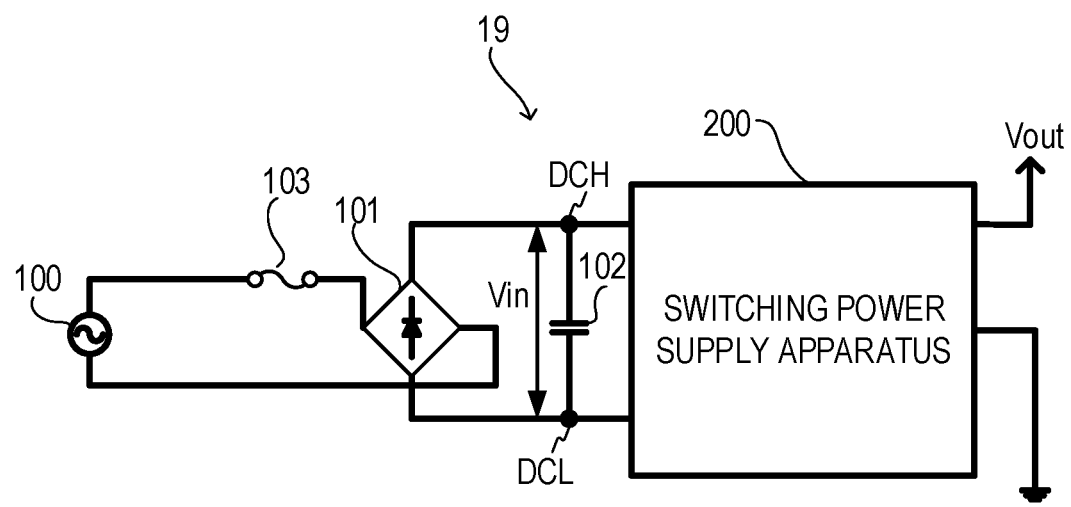
FIG. 2 is a diagram for illustrating a configuration of a power supply apparatus according to the first embodiment to the fourth embodiment.

FIG. 2 is a diagram for illustrating a schematic configuration of the power supply apparatus in the embodiment. As illustrated in FIG. 2, the power supply apparatus 19 includes a rectifying/smoothing portion, which rectifies/smooths an AC voltage input from a commercial AC power supply 100, and a switching power supply apparatus 200. The rectifying/smoothing portion being a first rectifying/smoothing portion is formed of a diode bridge 101 and a smoothing capacitor 102. The AC voltage input from the commercial AC power supply 100 is full-wave rectified by the diode bridge 101 through a current fuse 103 for circuit protection, and is smoothed by the smoothing capacitor 102, and a DC voltage Vin is consequently generated. It is assumed that an electric potential on a lower side of the smoothing capacitor 102 is referred to as "electric potential DCL," and an electric potential on a higher side thereof is referred to as "electric potential DCH."

The DC voltage Vin being a charge voltage for the smoothing capacitor 102 is input to the switching power supply apparatus 200. The switching power supply apparatus 200 steps down the input DC voltage Vin to generate a DC voltage Vout, and the generated voltage Vout is output to a load.

[Configuration of Switching Power Supply Apparatus]

Figure 3:
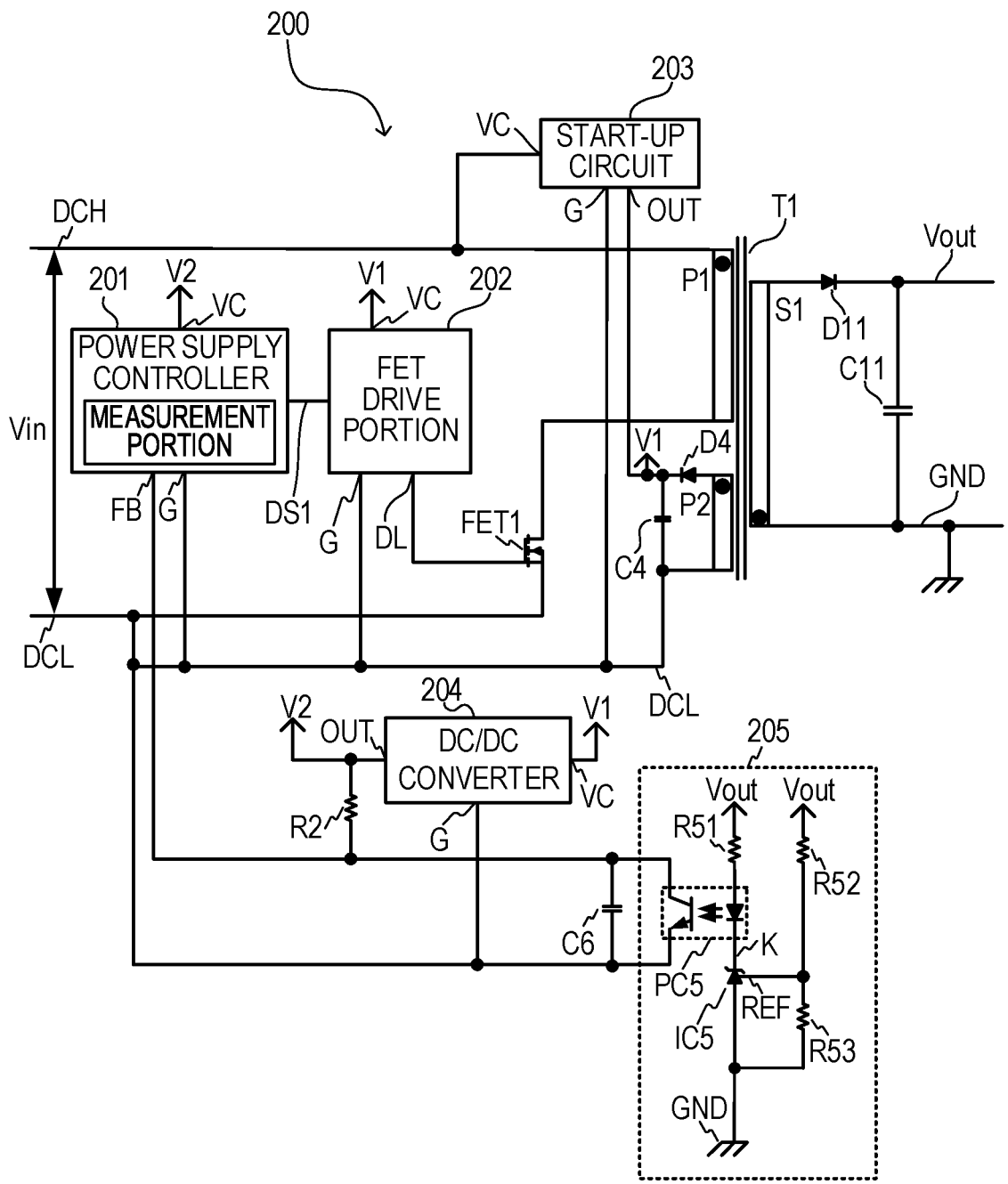
FIG. 3 is a circuit diagram for illustrating a circuit configuration of a switching power supply apparatus in the first embodiment.

FIG. 3 is a circuit diagram for illustrating a circuit configuration of the switching power supply apparatus 200. In FIG. 3, the switching power supply apparatus 200 includes an insulating transformer T1 having a primary coil P1 and an auxiliary coil P2 on a primary side, and having a secondary coil S1 on a secondary side. In FIG. 3, black dots of the transformer T1 each indicate a winding direction of each coil. To the primary coil P1 of the transformer T1, a field effect transistor 1 (hereinafter referred to as "FET1") being a first switching element is serially connected. Supply or cutoff of the electric power to the primary coil is performed by a switching operation of the FET1, to thereby supply energy from the primary coil P1 on the primary side of the transformer T1 to the secondary coil S1 on the secondary side thereof. Meanwhile, on the secondary side of the transformer T1, there are provided a diode D11 and a capacitor C11 forming a rectifying/smoothing circuit for rectifying/smoothing a flyback voltage induced on the secondary coil S1.

Moreover, on the auxiliary coil P2 on the primary side of the transformer T1, a voltage (hereinafter referred to as "forward voltage") obtained by multiplying the input voltage Vin by a ratio of number of turns ((number of turns NP2 of the auxiliary coil P2)/(number of turns NP1 of the primary coil P1)) is induced in a period in which the FET1 is in the ON state. The voltage induced on the auxiliary coil P2 is rectified and smoothed by a diode D4 and a capacitor C4 forming a second rectifying/smoothing portion, to thereby generate a power supply voltage V1.

(Feedback Portion)

The switching power supply apparatus 200 includes a feedback portion 205 being a feedback unit which feeds back voltage information on the voltage Vout output to the load connected to the power supply apparatus to the primary side of the transformer T1. The feedback portion 205 generates a voltage signal (hereinafter referred to as "FB terminal voltage") to be input to a FB terminal of a power supply controller 201 based on a target voltage and the output voltage Vout. The feedback portion 205 includes a shunt regulator IC5, a photocoupler PC5, and resistors R51, R52, and R53. The target voltage of the output voltage Vout is set by a reference voltage of an REF terminal (reference terminal) of the shunt regulator IC5, the resistor R52, and the resistor R53.

To the REF terminal of the shunt regulator IC5, a voltage obtained by dividing the output voltage Vout by the resistors R52 and R53 is input. The shunt regulator IC5 compares the voltage input to the REF terminal and the reference voltage with each other, and is brought into a conductive state when the voltage input to the REF terminal is higher than the reference voltage, and a current flows through an LED of the photocoupler PC5. Accordingly, the LED of the photocoupler PC5 turns on, and a phototransistor is brought into an ON state. As a result, a charge voltage of a capacitor C6 is discharged, and the FB terminal voltage of the power supply controller 201 decreases.

Meanwhile, the shunt regulator IC5 is brought into a non-conductive state when the voltage input to the REF terminal is equal to or lower than the reference voltage, and the current consequently does not flow through the LED of the photocoupler PC5. Accordingly, the LED of the photocoupler PC5 turns off, and the phototransistor is brought into an OFF state. As a result, the charge voltage increases through charge of the capacitor C6, and the FB terminal voltage of the power supply controller 201 increases. The FB terminal voltage takes a predetermined voltage value when the output voltage Vout is the same voltage as the target voltage. Moreover, the FB terminal voltage falls below the predetermined voltage value when the output voltage Vout is higher than the target voltage. The FB terminal voltage exceeds the predetermined voltage value when the output voltage Vout is lower than the target voltage.

(Power Supply Controller)

In the embodiment, the power supply controller 201 includes an arithmetic controller (for example, CPU or ASIC (Application Specific Integrated Circuit)) which operates based on a clock signal from an oscillator or the like, and includes a timer (measurement portion) which measures a period of time and a memory (not shown) which stores data and the like. A power supply voltage V2 generated by a DC/DC converter 204 described below is supplied to a VC terminal of the power supply controller 201. The power supply controller 201 outputs a control signal DS1 for controlling the switching operation of the FET1 to an FET (field effect transistor) drive portion 202 based on the FB terminal voltage.

(FET Drive Portion)

The FET drive portion 202 performs the switching control for the FET1 in accordance with the control signal DS1 output from the power supply controller 201. In details, the FET drive portion 202 generates a drive signal DL to be output to a gate terminal of the FET1 in accordance with the control signal DS1 output from the power supply controller 201, to thereby output the drive signal DL to the gate terminal of the FET1. The FET1 performs the switching operation in accordance with the drive signal DL output from the FET drive portion 202. Moreover, the power supply voltage V1 generated from the voltage induced on the auxiliary coil P2 on the primary side of the transformer T1 is supplied to a VC terminal of the FET drive portion 202.

(DC/DC Converter and Start-Up Circuit)

The DC/DC converter 204 is a 3-terminal regulator or a step-down-type switching power supply apparatus, and generates the power supply voltage V2 from the power supply voltage V1 input to a VC terminal and outputs the generated power supply voltage V2 from an OUT terminal. A start-up circuit 203 is a 3-terminal regulator or a step-down-type switching power supply apparatus, and generates the power supply voltage V1 from the DC voltage Vin input to a VC terminal and outputs the generated power supply voltage V1 from an OUT terminal. The start-up circuit 203 is a circuit which operates only when the power supply voltage V1 generated from the voltage induced on the auxiliary coil P2 of the transformer T1 is equal to or lower than a predetermined voltage, and is used to supply the power supply voltage V1 at a startup of the switching power supply apparatus 200.

[Control Sequence of Power Supply Controller]

The power supply controller 201 in the embodiment performs a continuous switching operation of continuously performing the switching operation of the FET1 in the print state of the printer 10. The power supply controller 201 performs an intermittent switching operation in the standby state or the sleep state of the printer 10. The state of the printer 10 is transmitted, through a signal (not shown), from the engine controller 20 to the power supply controller 201. The power supply controller 201 switches between the continuous switching and the intermittent switching through a signal (not shown).

The power supply controller 201 uses the FB voltage to calculate an On-Duty of the DS1 signal in the continuous switching operation, and outputs a pulse signal having the calculated On-Duty to the control signal DS1. The power supply controller 201 repeats the same operation in the print state.

Figure 4:
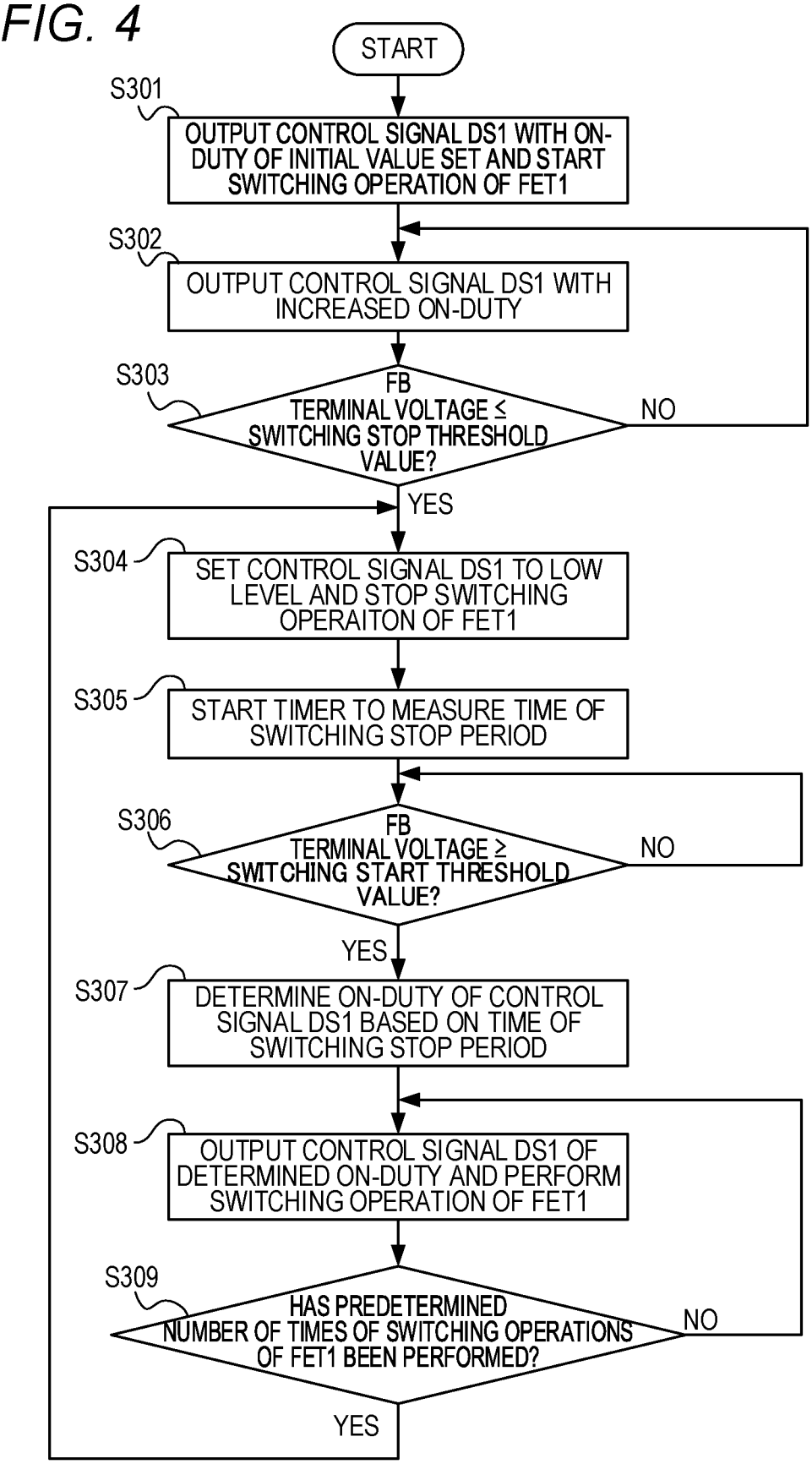
FIG. 4 is a flowchart for illustrating a switching control sequence of a power supply controller at a start and in an intermittent switching operation in the first embodiment.

FIG. 4 is a flowchart for illustrating a control sequence for the output voltage Vout by the power supply controller 201 at the startup and in the intermittent switching operation in the embodiment. The processing of FIG. 4 is performed by the power supply controller 201 which is started up when the AC voltage is supplied from the commercial AC power supply 100 to the switching power supply apparatus 200, and the power supply voltage V2 is generated by the start-up circuit 203 and the DC/DC converter 204. In the embodiment, the power supply controller 201 measures a period of time of a switching stop period from the stop of the switching operation of the FET1 to the start of the switching operation based on the FB terminal voltage, to thereby detect a state of a load connected to the power supply apparatus.

After that, the power supply controller 201 controls the intermittent switching operation of the FET1 in accordance with the detected load state.

In Step S301, the power supply controller 201 outputs, to the FET drive portion 202, the control signal DS1 with the On-Duty of an initial value being set thereto. The On-Duty refers to a ratio (%) of an ON state of a pulse signal of the control signal DS1 formed of the pulse signal in one cycle of the pulse signal. As described above, the FET drive portion 202 outputs, to the gate terminal of the FET1, the DL signal in accordance with the control signal DS1, the switching operation of the FET1 is consequently started, and a minute output voltage Vout is output on the secondary side of the transformer T1.

In Step S302, the power supply controller 201 outputs the control signal DS1 with a value larger than the On-Duty set for the previous time being set thereto in order to increase the output voltage Vout. As a result, the FET1 performs a switching operation in accordance with the control signal DS1, and the output voltage Vout output on the secondary side of the transformer T1 increases.

In Step S303, the power supply controller 201 acquires the FB terminal voltage input to the FB terminal, and determines whether or not the acquired FB terminal voltage has become equal to or lower than a switching stop threshold value at which the switching operation of the FET1 is stopped ((FB terminal voltage)≤(switching stop threshold value)?). As described above, the FB terminal voltage increases when the output voltage Vout is lower than the target voltage, and decreases when the output voltage Vout is higher than the target voltage. A threshold voltage in this case is a threshold voltage for stopping the switching operation of the FET1 when the output voltage Vout is higher than the target voltage. The power supply controller 201 causes the processing to proceed to Step S304 when the acquired FB terminal voltage is equal to or lower than the switching stop threshold voltage, and causes the processing to return to Step S302 when the acquired FB terminal voltage is higher than the switching stop threshold voltage.

In Step S304, the power supply controller 201 sets the control signal DS1 to be output to the FET drive portion 202 to the low level in order to stop the switching operation of the FET1 to transition to the switching stop period. In Step S305, the power supply controller 201 resets and then starts the timer to measure the period of time of the switching stop period.

In Step S306, the power supply controller 201 acquires the FB terminal voltage input to the FB terminal, and determines whether or not the acquired FB terminal voltage is equal to or higher than a threshold voltage at which the switching operation of the FET1 is started ((FB terminal voltage)≥(switching start threshold value)?). The threshold voltage in this case is a threshold voltage for starting the switching operation of the FET1 when the output voltage Vout is lower than the target voltage. The power supply controller 201 causes the processing to proceed to Step S307 when the acquired FB terminal voltage is equal to or higher than the switching start threshold value, and causes the processing to return to Step S306 when the acquired FB terminal voltage is lower than the threshold voltage.

In Step S307, the power supply controller 201 stops the timer, refers to the timer, and determines the On-Duty of the control signal DS1 in accordance with the length of the switching stop period based on time information on the acquired switching stop period. The power supply controller 201 may store, in advance, in the memory (not shown), data in which the period of time of the switching stop period and the On-Duty of the control signal DS1 are associated with each other, and may determine the On-Duty of the control signal DS1 based on the time information on the acquired switching stop period.

In Step S308, the power supply controller 201 outputs, to the FET drive portion 202, the control signal DS1 set to the On-Duty determined in Step S307, to thereby perform the switching operation of the FET1. In Step S309, the power supply controller 201 outputs the control signal DS1, and determines whether or not the FET1 has performed the switching operation a predetermined number of times. When the power supply controller 201 determines that the FET1 has performed the switching operation the predetermined number of times, the power supply controller 201 causes the processing to return to Step S304. When the power supply controller 201 determines that the FET1 has not performed the switching operation the predetermined number of times, the power supply controller 201 causes the processing to return to Step S308. Subsequently, the power supply controller 201 repeats the processing steps of Step S304 to Step S309, to thereby control the switching operation of the FET1 so that the output voltage Vout in accordance with the load connected to the power supply apparatus is output.

In the embodiment, after the power supply controller 201 performs the switching operation of the FET1 the predetermined number of times, the power supply controller 201 stops the switching operation of the FET1, and transitions to the switching stop period. After that, when the output voltage Vout decreases due to the load connected to the power supply apparatus, and the FB terminal voltage consequently becomes equal to or higher than the switching start threshold value, the power supply controller 201 ends the switching stop period, and again repeats the process of performing the switching operation of the FET1 the predetermined number of times. In the embodiment, the switching period in which the FET1 performs the switching operation the predetermined number of times has a constant frequency of the control signal DS1 and also has a constant cycle, and is consequently a period having a predetermined time width. Meanwhile, the switching stop period continues until the FB terminal voltage becomes equal to or higher than the threshold voltage at which the switching operation of the FET1 is started, and hence the switching stop period changes depending on a state of the load. Moreover, the power supply controller 201 increases the On-Duty of the control signal DS1 in accordance with the period of time of the switching stop period when the load is high, to thereby increase the energy supplied to the secondary side of the transformer T1. Meanwhile, the power supply controller 201 reduces the On-Duty of the control signal DS1 in accordance with the period of time of the switching stop period when the load is low, to thereby reduce the energy supplied to the secondary side of the transformer T1.

[Switching Operation of Switching Power Supply Apparatus]

Figure 5A:
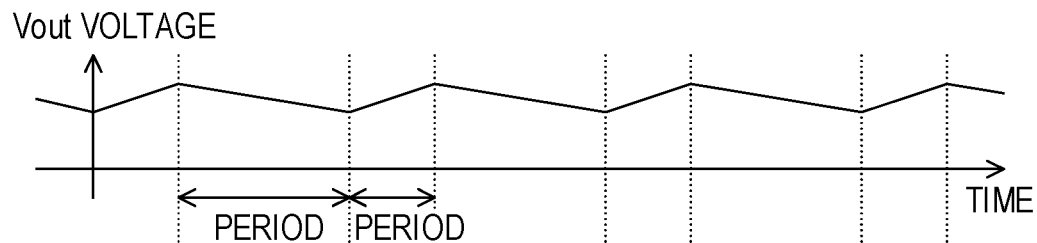
FIG. 5A, FIG. 5B, FIG. 5C, and FIG. 5D are graphs for showing voltage waveforms of the switching power supply apparatus in the first embodiment.
Figure 5B:
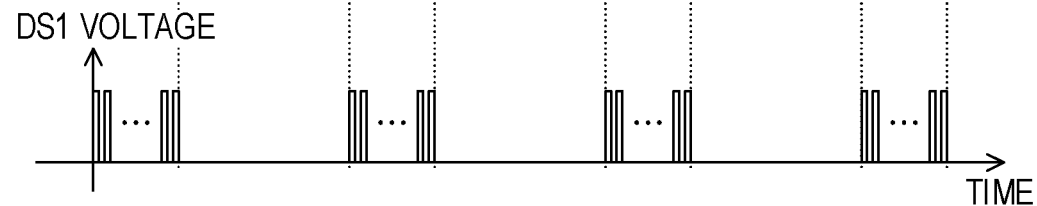
Figure 5C:
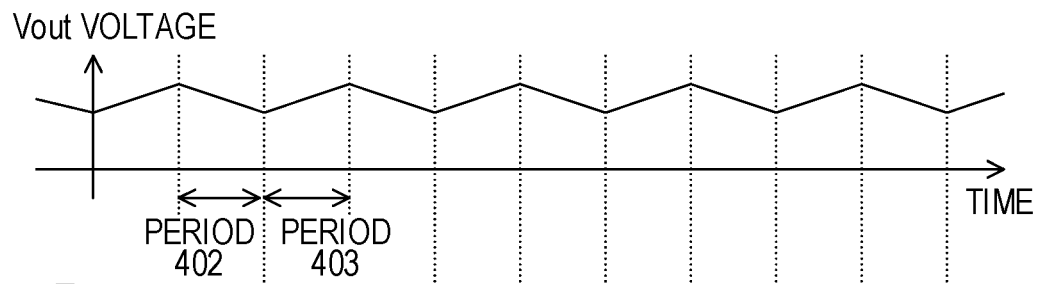
Figure 5D:
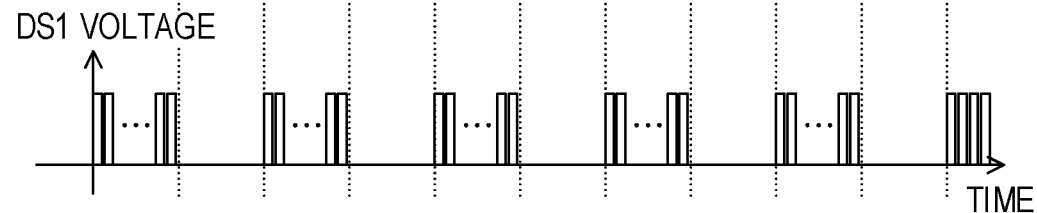

FIG. 5A, FIG. 5B, FIG. 5C, and FIG. 5D are graphs for showing voltage waveforms and signal waveforms in the switching power supply apparatus 200. FIG. 5A and FIG. 5B show a voltage waveform and a signal waveform, respectively, when a load connected to the power supply apparatus is low. FIG. 5A shows a voltage waveform of the output voltage Vout. FIG. 5B shows a signal waveform (voltage waveform) of the control signal DS1. Meanwhile, FIG. 5C and FIG. 5D show a voltage waveform and a signal waveform, respectively, when the load connected to the power supply apparatus is high. FIG. 5C shows a voltage waveform of the output voltage Vout. FIG. 5D shows a signal waveform (voltage waveform) of the control signal DS1. Vertical axes of FIG. 5A, FIG. 5B, FIG. 5C, and FIG. 5D each indicate the voltage, and horizontal axes thereof each indicate the time. The power supply controller 201 performs the intermittent switching control (intermittent control) of repeating the stop period (periods 400 and 402) in which the FET1 stops the switching operation and the switching period (periods 401 and 403) in which the FET1 performs the switching operation in order to increase a power supply efficiency.

(Switching Operation for Low Load)

With reference to FIG. 5A and FIG. 5B, an operation of the switching power supply apparatus 200 when the load on the secondary side is low is described. The period 400 of FIG. 5B is the switching stop period of the FET1, and the control signal DS1 is at the low level (state in which the control signal DS1 is not output) as shown in FIG. 5B. Moreover, in the switching stop period of the FET1, the energy supply (power supply) to the secondary side of the transformer T1 is not performed, and hence the output voltage Vout gradually decreases due to the load on the secondary side (load connected to the power supply apparatus) (FIG. 5A).

The period 401 of FIG. 5B is the switching operation period of the FET1, and the control signal DS1 has a PWM waveform of FIG. 5B, and each period corresponding to the high level in the one cycle of the control signal DS1 indicates the On-Duty. As shown in FIG. 5A, the output voltage Vout gradually increases in the period 401. The On-Duty of the control signal DS1 is determined through the above-mentioned processing step of Step S307 of FIG. 4. In the embodiment, as the switching stop period decreases, the On-Duty of the control signal DS1 is increased in inversely proportional to the period of time of the switching stop period (for example, the period 400), to thereby increase the power supply amount (energy amount) to the secondary side of the transformer T1. Consequently, even when the load increases, a high power supply efficiency can be maintained by supplying sufficiently large electric power to the secondary-side load in the switching operation period of the FET1.

(Switching Operation for High Load)

Next, with reference to FIG. 5C and FIG. 5D, the operation of the switching power supply apparatus 200 when the load on the secondary side is high is described. The period 402 of FIG. 5D is the switching stop period of the FET1, and the control signal DS1 is at the low level as shown in FIG. 5D. In the switching stop period of the FET1, the power supply (energy supply) to the secondary side of the transformer T1 is not performed, and hence the output voltage Vout gradually decreases due to the load connected to the power supply apparatus (FIG. 5C). Moreover, the load on the secondary side is higher than that of FIG. 5A and FIG. 5B, and hence the switching stop period (period 402) is shorter than the period 400 of FIG. 5B in the case of the low load.

The period 403 of FIG. 5D is the switching operation period of the FET1, and the control signal DS1 has a PWM waveform of FIG. 5D. That is, the time of the period 402 being the switching stop period is shorter than the period 400 of FIG. 5B, and hence it is detected that the load on the secondary side is high. Accordingly, as shown in FIG. 5D, the On-Duty of the control signal DS1 output in the period 403 is higher than the On-Duty of the control signal DS1 of FIG. 5B in the case of the low load. Consequently, the efficient switching operation of the FET1 can be performed also in the case of the high load on the secondary side.

Moreover, when the load is high, a voltage increase in the output voltage Vout by the switching operation of the FET1 for one time corresponding to the control signal DS1 is smaller than that in the case of the low load. Accordingly, in order to maintain a voltage ripple (peak-to-peak voltage) of the output voltage constant independently of the load, when the load is high, the number of times of the switching of the FET1 is increased in order to compensate for the decrease in the voltage increase of the output voltage Vout. Consequently, a switching loss can be reduced, and the efficient switching can be achieved in accordance with the load.

As described above, the current load state can be detected through the measurement of the period of time of the switching stop period of the FET1. After that, the On-Duty of the control signal DS1 is determined in accordance with the measured period of time of the switching stop period, to thereby perform the switching control of the FET1. As a result, even when the above-mentioned range switching circuit is not provided, the On-Duty of the control signal DS1 is varied in accordance with the load state, thereby being capable of achieving the efficient power supply.

As described above, according to the embodiment, the electric power can efficiently be supplied in accordance with the load state without adding a new circuit.

Second Embodiment

In a second embodiment, there is described a switching power supply apparatus which performs predetermined power supply to a load based on the period of time of the switching stop period in the intermittent switching control and the voltage of the DC voltage Vin applied to the primary side of the transformer even when the DC voltage Vin fluctuates. The configuration of the printer 10 being the image forming apparatus in the embodiment is the same as that in the first embodiment, and description thereof is omitted by using the same reference symbols to describe the same apparatus.

[Configuration of Switching Power Supply Apparatus]

Figure 6:
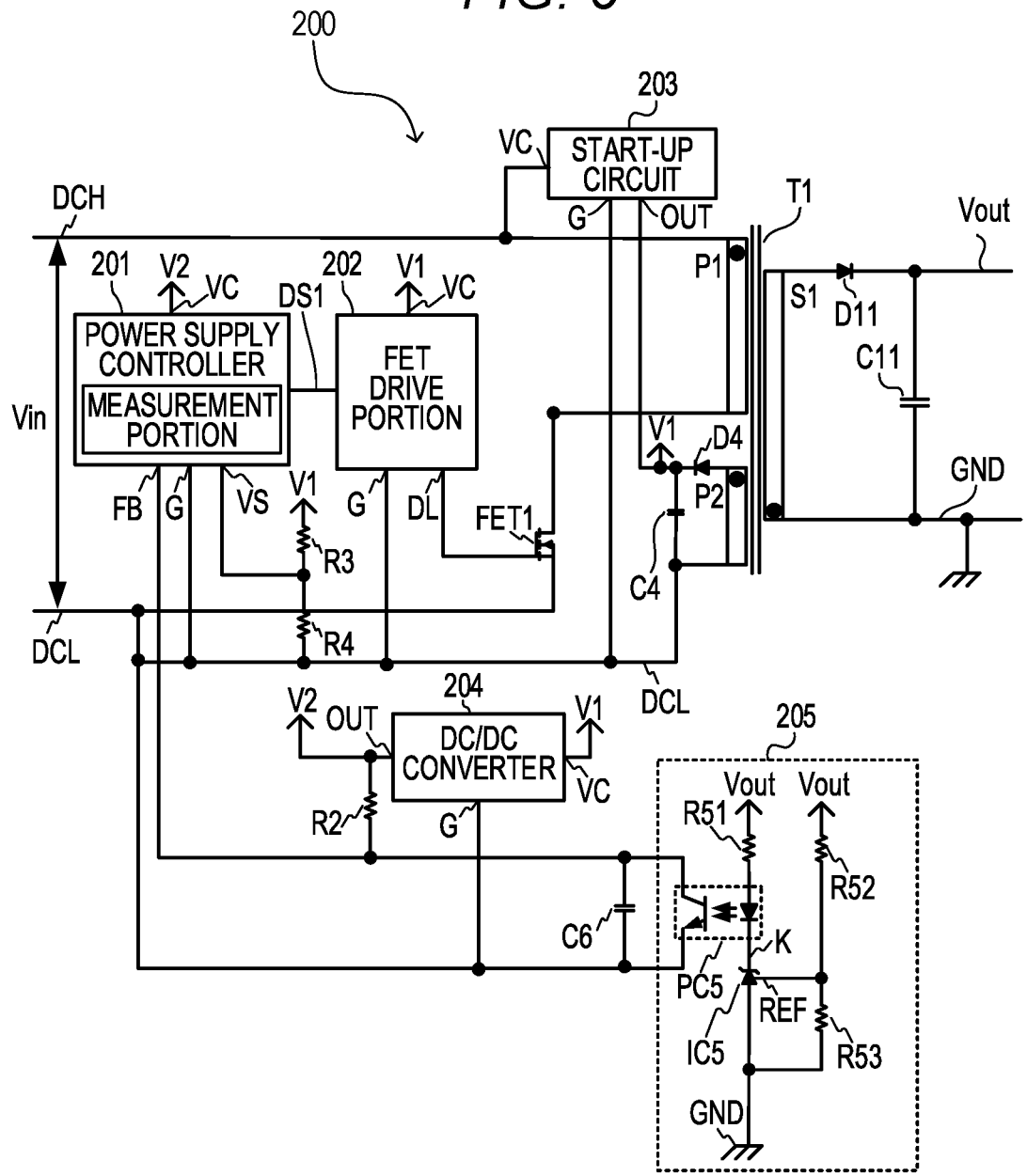
FIG. 6 is a circuit diagram for illustrating the circuit configuration of the switching power supply apparatus in the second embodiment.

FIG. 6 is a circuit diagram for illustrating the circuit configuration of the switching power supply apparatus 200 in the embodiment. The circuit diagram of FIG. 6 is different from the circuit diagram of FIG. 3 in the first embodiment in that a VS terminal is added to the power supply controller 201, and a resistance voltage-divider circuit (voltage divider) which divides the power supply voltage V1, and inputs the divided voltage to the VS terminal is added. The other circuit configuration is the same as that of FIG. 3 in the first embodiment, and description of the same circuit components is herein omitted by using the same reference symbols to describe the same circuit components.

The forward voltage induced on the auxiliary coil P2 of the transformer T1 is rectified and smoothed by the diode D4 and the capacitor C4, and is charged in the capacitor C4. After that, a voltage obtained by dividing the voltage charged in the capacitor C4 at a division ratio between the resistors R3 and R4 is input to the VS terminal of the power supply controller 201. The forward voltage is a voltage obtained by multiplying the DC voltage Vin charged in the smoothing capacitor 102 by the ratio of number of turns between the number of turns NP1 of the primary coil P1 and the number of turns NP2 of the auxiliary coil P2 of the transformer T1. Thus, a voltage corresponding to the DC voltage Vin is input to the VS terminal. When the DC voltage Vin decreases, the voltage input to the VS terminal also decreases. When the DC voltage Vin increases, the voltage input to the VS terminal also increases. Thus, the power supply controller 201 detects the voltage input to the VS terminal, thereby being capable of detecting the DC voltage Vin. The DC voltage Vin is generated through the full-wave rectification of the AC voltage input from the commercial AC power supply 100, and hence the AC voltage can be detected. Accordingly, the power supply controller 201 determines the On-Duty of the control signal DS1 in accordance with the acquired input voltage of the VS terminal, thereby being capable of efficiently supplying the electric power to the load even when the AC voltage input from the commercial AC power supply 100 fluctuates.

[Control Sequence of Power Supply Controller]

The power supply controller 201 performs the continuous switching operation in the print state of the printer 10, and performs the intermittent switching operation in the standby state or the sleep state of the printer 10 in the embodiment as in the first embodiment. The continuous switching operation and the intermittent switching operation are also the same as those in the first embodiment, and description thereof is therefore omitted.

Figure 7:
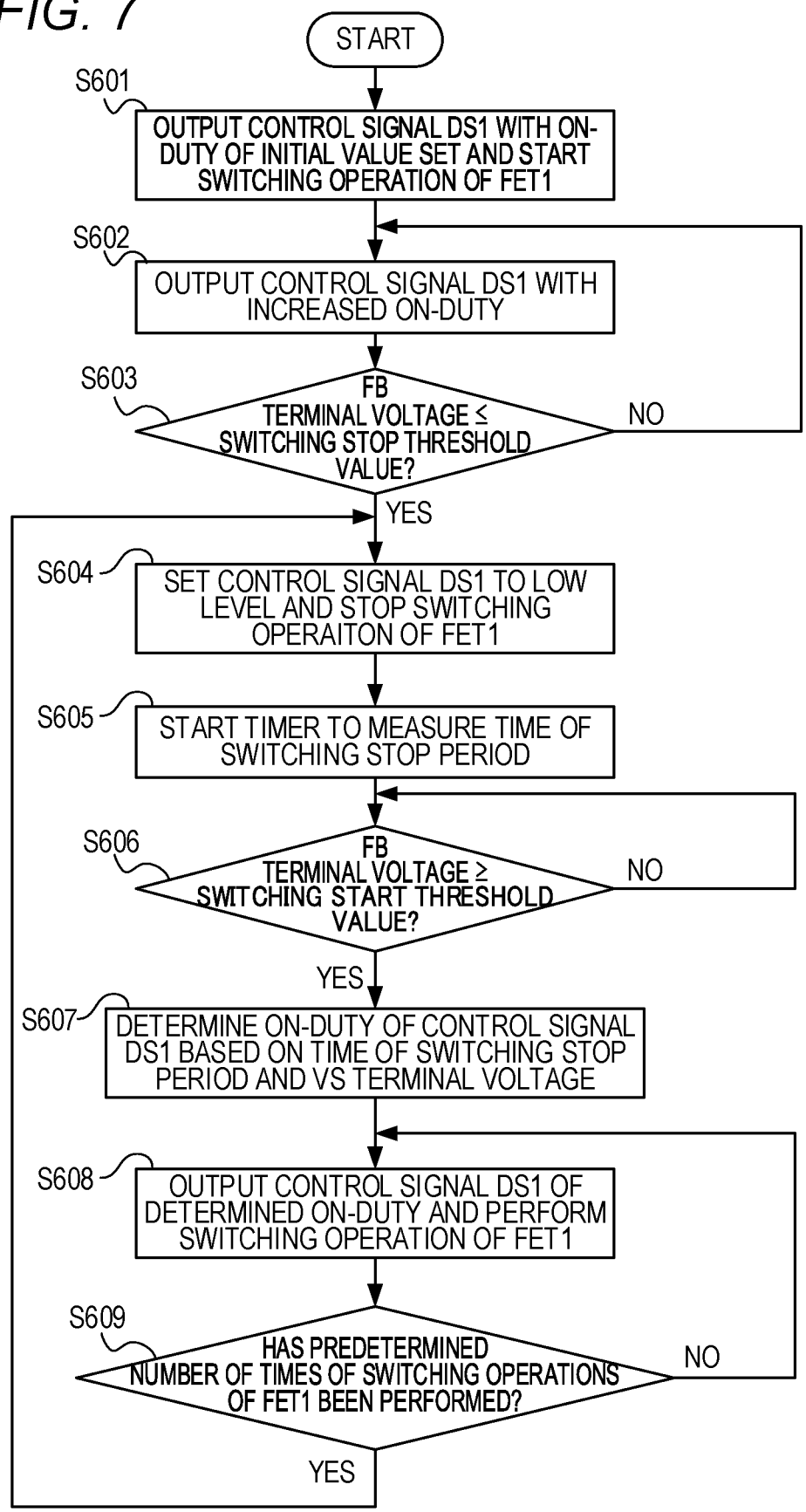
FIG. 7 is a flowchart for illustrating the switching control sequence of the power supply controller at the start and in the intermittent switching operation in the second embodiment.

FIG. 7 is a flowchart for illustrating a control sequence for the output voltage Vout by the power supply controller 201 at the startup and in the intermittent switching operation in the embodiment. Similar to FIG. 4 in the first embodiment, the processing of FIG. 7 is performed by the power supply controller 201 which is started up when the AC voltage is supplied from the commercial AC power supply 100 to the switching power supply apparatus 200, and the power supply voltage V2 is generated by the start-up circuit 203 and the DC/DC converter 204.

Processing steps of from Step S601 to Step S606 are the same as the processing steps of from Step S301 to Step S306 of FIG. 4 in the first embodiment, and description thereof is therefore omitted. In Step S607, the power supply controller 201 stops the timer, and refers to the timer to acquire the time information on the switching stop period. After that, the power supply controller 201 acquires the VS terminal voltage input to the VS terminal when the timer is stopped, corrects the acquired VS terminal voltage based on the time information on the switching stop period, and estimates the input voltage Vin based on the corrected VS terminal voltage. After that, the power supply controller 201 determines the On-Duty of the control signal DS1 based on the estimated input voltage Vin and the time information on the switching stop period. Processing steps of Step S608 and Step S609 are the same as the processing steps of Step S308 and Step S309 of FIG. 4 in the first embodiment, and description thereof is therefore omitted.

[Switching Operation of Switching Power Supply Apparatus]

Figure 8A:
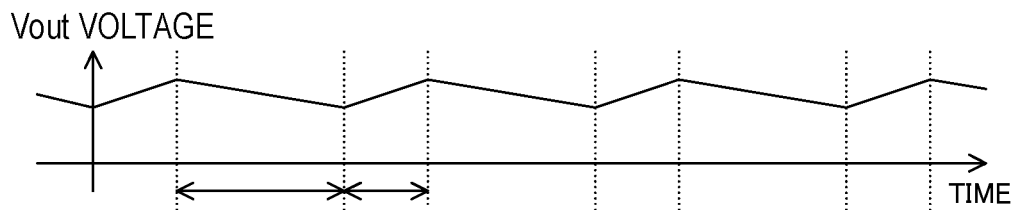
FIG. 8A, FIG. 8B, FIG. 8C, FIG. 8D, FIG. 8E, and FIG. 8F are graphs for showing the voltage waveforms of the switching power supply apparatus in the second embodiment.
Figure 8B:
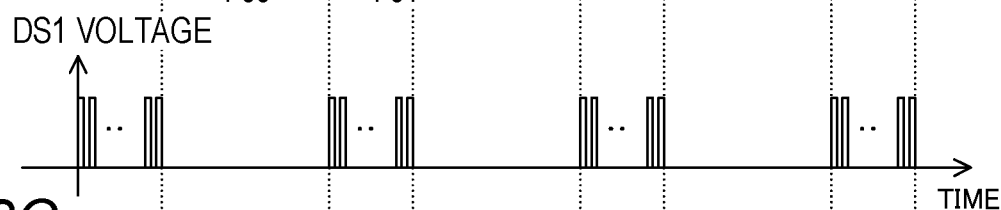
Figure 8C:
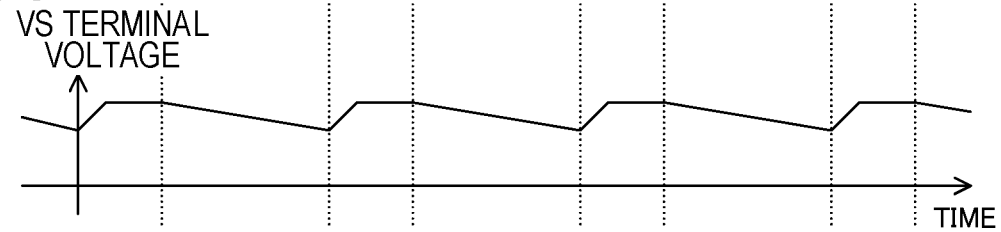
Figure 8D:
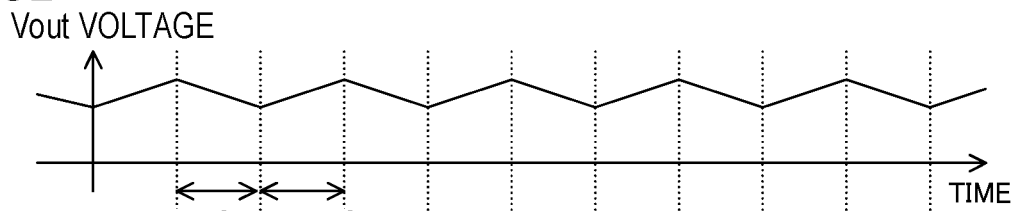
Figure 8E:
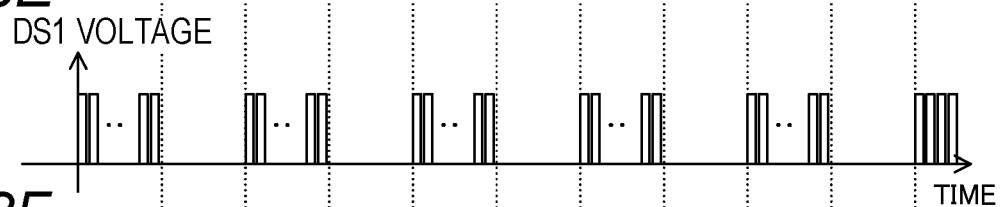
Figure 8F:
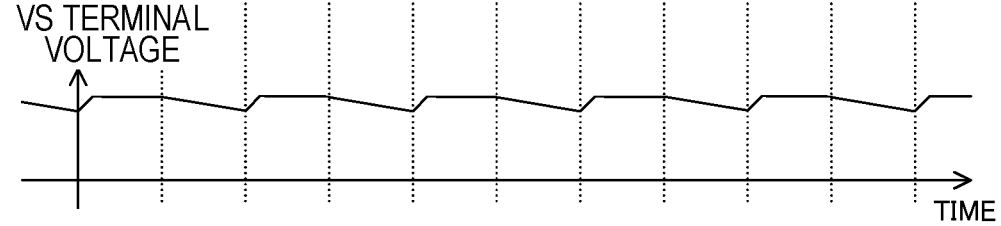

FIG. 8A, FIG. 8B, FIG. 8C, FIG. 8D, FIG. 8E, and FIG. 8F are graphs for showing voltage waveforms and signal waveforms in the switching power supply apparatus 200. FIG. 8A, FIG. 8B, and FIG. 8C are graphs for showing the voltage waveforms and the signal waveform when the load connected to the power supply apparatus is low. FIG. 8A shows the voltage waveform of the output voltage Vout. FIG. 8B shows the signal waveform (voltage waveform) of the control signal DS1. FIG. 8C shows a voltage waveform of the VS terminal voltage input to the VS terminal. Meanwhile, FIG. 8D, FIG. 8E, and FIG. 8F are graphs for showing the voltage waveforms and the signal waveform when the load connected to the power supply apparatus is high. FIG. 8D shows the voltage waveform of the output voltage Vout. FIG. 8E shows the signal waveform (voltage waveform) of the control signal DS1. FIG. 8F shows the voltage waveform of the VS terminal voltage input to the VS terminal. Vertical axes of FIG. 8A to FIG. 8F each indicate the voltage, and horizontal axes thereof each indicate the time. Also, in the embodiment, as in the first embodiment, the power supply controller 201 performs the following intermittent switching control in order to increase the power supply efficiency. That is, the power supply controller 201 performs the intermittent switching control of repeating the stop period (periods 700 and 702) in which the FET1 stops the switching operation and the switching period (periods 701 and 703) in which the FET1 performs the switching operation.

(Switching Operation for Low Load)

With reference to FIG. 8A, FIG. 8B, and FIG. 8C, the operation of the switching power supply apparatus 200 when the load on the secondary side is low is described. The period 700 of FIG. 8B is the switching stop period of the FET1, and the control signal DS1 is at the low level (state in which the control signal DS1 is not output) as shown in FIG. 8B. Moreover, in the switching stop period of the FET1, the power supply to the secondary side and the auxiliary coil P2 of the transformer T1 is not performed, and the output voltage Vout gradually decreases due to the load on the secondary side (load connected to the power supply apparatus) as shown in FIG. 8A. A speed of the decrease in the voltage of the output voltage Vout is proportional to a magnitude of the load on the secondary side. Moreover, the electric power is not supplied to the auxiliary coil P2 in the switching stop period of the FET1, and hence the voltage charged in the capacitor C4 is discharged as shown in FIG. 8C. Accordingly, the VS terminal voltage of the power supply controller 201 also decreases. A voltage decrease per unit time of the VS terminal voltage in the switching stop period of the FET1 is determined by a time constant given by resistance values of the resistors R3 and R4 and a capacitance of the capacitor C4.

The period 701 of FIG. 8B is the switching operation period of the FET1, and the control signal DS1 has a PWM waveform of FIG. 8B, and each period corresponding to the high level in the one cycle of the control signal DS1 indicates the On-Duty. As shown in FIG. 8A, the output voltage Vout gradually increases in the period 701. Moreover, when the switching operation of the FET1 starts, the electric power is supplied to the auxiliary coil P2. As a result, as shown in FIG. 8C, the VS terminal voltage increases to a voltage corresponding to a magnitude of the DC voltage Vin, that is, a voltage obtained by dividing, by the voltage divider resistors R3 and R4, the voltage obtained by multiplying the input voltage Vin by the ratio of number of turns between the number of turns of the primary coil P1 and the number of turns of the auxiliary coil P2 of the transformer T1. However, the VS terminal voltage is delayed in accordance with the time constant determined by the resistance values of the resistors R3 and R4 and the capacitance of the capacitor C4, and hence starts to increase after a short delay from the switching operation start timing of the FET1.

The On-Duty of the control signal DS1 in the period 701 is determined through the processing step of Step S607 of FIG. 7. As described above, in the embodiment, the On-Duty (ratio of the on-state time in which the FET1 is in the ON state) of the control signal DS1 is determined in accordance with not only the period of time of the switching stop period of the FET1 but also the DC voltage Vin estimated based on the acquired VS terminal voltage. The power supply amount to the secondary side of the transformer T1, that is, the load is determined through a product of the DC voltage Vin and the on-state time in which the FET1 is in the ON state.

Accordingly, even when the DC voltage Vin fluctuates, the power supply having a high power supply efficiency is achieved by determining the On-Duty of the control signal DS1 such that the product of the DC voltage Vin and the on-state time in which the FET1 is in the ON state is constant.

However, the charge voltage of the capacitor C4 is discharged in the switching stop period of the FET1, and hence the VS terminal voltage decreases as the time elapses in the switching stop period. Thus, the power supply controller 201 calculates, in advance, a voltage drop per unit time of the VS terminal voltage, stores the calculated voltage drop per unit time in the memory (not shown), and acquires the VS terminal voltage at the time when the switching stop period of the FET1 ends. After that, the power supply controller 201 adds, to the acquired VS terminal voltage, a voltage calculated by multiplying the data on the voltage drop per unit time acquired from the memory and the period of time of the switching stop period, thereby being capable of calculating the VS terminal voltage at the start time of the switching stop period. In the embodiment, the power supply controller 201 measures, in advance, the decrease voltage per unit time of the VS terminal voltage, stores the decrease voltage per unit time in the memory, and reads the decrease voltage per unit time from the memory when the VS terminal voltage is to be corrected, to thereby correct the acquired VS terminal voltage. A method for correcting the acquired VS terminal voltage is not limited to the above-mentioned method, and the VS terminal voltage may be calculated based on, for example, a time constant at the time of the discharge.

The power supply controller 201 can estimate the DC voltage Vin at the start time of the switching stop period (which is also an end time of the switching period of the FET1) based on the VS terminal voltage at the start time of the switching stop period calculated through the correction of the acquired VS terminal voltage. Moreover, as in the first embodiment, it is possible to detect the state of the load connected to the power supply apparatus by detecting the period of time of the switching stop period of the FET1. After that, the On-Duty of the control signal DS1 is set in accordance with the period of time of the switching stop period, to thereby supply the electric power to the load.

(Switching Operation for High Load)

Next, with reference to FIG. 8D, FIG. 8E, and FIG. 8F, the operation of the switching power supply apparatus 200 when the load on the secondary side is high is described. The period 702 of FIG. 8E is the switching stop period of the FET1, and the control signal DS1 is at the low level as shown in FIG. 8E. Moreover, the power supply (energy supply) to the secondary side and the auxiliary coil P2 of the transformer T1 is not performed in the switching stop period of the FET1, and the output voltage Vout and the VS terminal voltage gradually decrease due to the load connected to the power supply apparatus as shown in FIG. 8D and FIG. 8F. The load on the secondary side (load connected to the power supply apparatus) is high, and hence, as shown in FIG. 8E, the period 702 is shorter than the period 700 in the case of the low load of FIG. 8B.

The switching stop period is short, and hence the VS terminal voltage does not decrease more than the VS terminal voltage in the case of the low load (FIG. 8C). The power supply controller 201 corrects the VS terminal voltage acquired at the end time of the switching stop period through use of the period of time of the switching stop period and the voltage decrease per unit time of the VS terminal voltage in the same process as that in the above-mentioned case of the low load, to thereby estimate an accurate DC voltage Vin. As a result, even when the period of time of the switching stop period fluctuates, information on the accurate DC voltage Vin is estimated, thereby being capable of performing power supply having a high power supply efficiency.

The period 703 of FIG. 8E is the switching operation period of the FET1, and the control signal DS1 has a PWM waveform of FIG. 8E. That is, the time of the period 702 being the switching stop period is shorter than the period 700 of FIG. 8B, and hence it is detected that the load on the secondary side is high. Accordingly, as shown in FIG. 8E, the On-Duty of the control signal DS1 output in the period 703 is higher than the On-Duty of the control signal DS1 of FIG. 8B in the case of the low load. Consequently, the switching operation of the FET1 can be performed with a high power supply efficiency also in the case of the high load on the secondary side.

As described above, also in the embodiment, as in the first embodiment, the current load state can be detected through the measurement of the period of time of the switching stop period of the FET1. After that, the On-Duty of the control signal DS1 is determined in accordance with the measured period of time of the switching stop period, to thereby perform the switching control of the FET1. As a result, it is possible to achieve the efficient power supply in accordance with the load state without providing the above-mentioned range switching circuit. Further, the efficient power supply can be achieved in accordance with the load state by using the measured period of time of the switching stop period to correct the acquired VS terminal voltage even when the voltage value of the AC voltage input from the commercial AC power supply 100 fluctuates.

In the embodiment and the first embodiment, the type of the switching power supply apparatus is the flyback type, but the present invention is not limited to the flyback type, and the present invention can also be applied to a type of the switching power supply apparatus such as an LLC power supply which uses an LLC resonant circuit. Moreover, in the embodiment, the switching control corresponding to the load on the secondary side is performed by changing the On-Duty of the control signal DS1 in accordance with the period of time of the switching stop period of the FET1 without changing the cycle (frequency) of the control signal DS1.

As described above, according to the embodiment, the electric power can efficiently be supplied in accordance with the load state without adding a new circuit.

Third Embodiment

In the first embodiment and the second embodiment, when the switching operation of the FET1 is performed the predetermined number of times, the switching operation is stopped independently of the state of the load in the intermittent switching control. In the third embodiment, there is described an embodiment in which the number of times of the switching of the FET1 is changed according to the period of time of the switching stop period of the FET1 in order to suppress occurrence of high-frequency sound in the intermittent switching control. The configuration of the printer 10 being the image forming apparatus in the embodiment is the same as that in the first embodiment, and description thereof is omitted by using the same reference symbols to describe the same apparatus.

[Configuration of Switching Power Supply Apparatus]

The configuration of the switching power supply apparatus in the embodiment is the same as that of the switching power supply apparatus 200 of FIG. 6 in the second embodiment, and description thereof is herein omitted by denoting the same circuit components by the same reference symbols as those of FIG. 6.

[Control Sequence of Power Supply Controller]

The power supply controller 201 performs the continuous switching operation in the print state of the printer 10, and performs the intermittent switching operation in the standby state or the sleep state of the printer 10 in the embodiment as in the first embodiment. The continuous switching operation and the intermittent switching operation are also the same as those in the first embodiment, and description thereof is therefore omitted.

Figure 9:
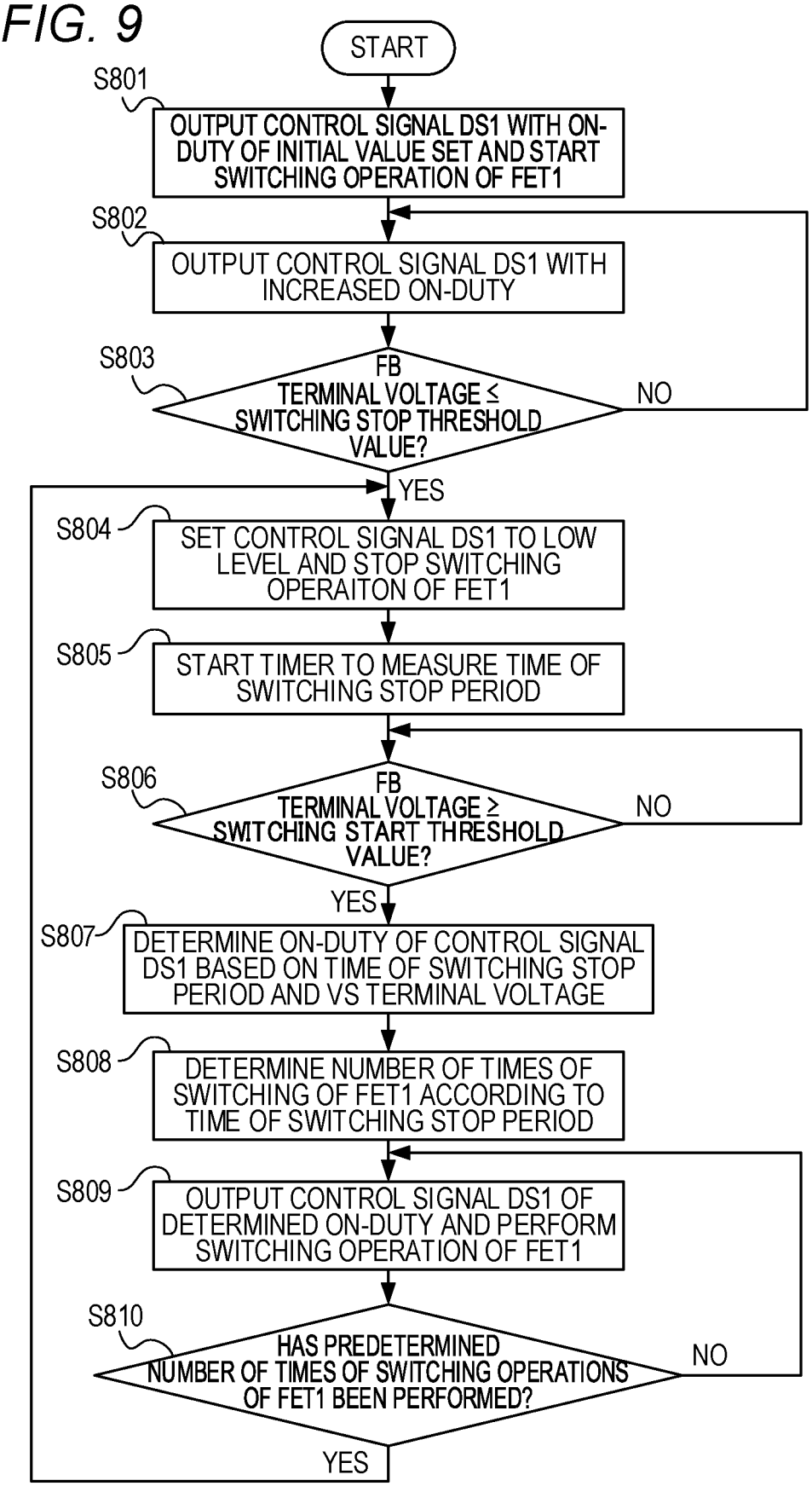
FIG. 9 is a flowchart for illustrating the switching control sequence of the power supply controller at the start and in the intermittent switching operation in the third embodiment.

FIG. 9 is a flowchart for illustrating the control sequence for the output voltage Vout by the power supply controller 201 at the startup and in the intermittent switching operation in the embodiment. Similar to FIG. 7 in the second embodiment, the processing of FIG. 9 is performed by the power supply controller 201 which is started up when the AC voltage is supplied from the commercial AC power supply 100 to the switching power supply apparatus 200, and the power supply voltage V2 is generated by the start-up circuit 203 and the DC/DC converter 204.

Processing steps of from Step S801 to Step S807 are the same as the processing steps of from Step S601 to Step S607 of FIG. 7 in the second embodiment, and description thereof is therefore omitted. In Step S808, the power supply controller 201 calculates the period of time of the switching period based on the time information on the switching stop period acquired in Step S807, and determines the number of times of the switching of the FET1 according to the period of time of the switching period. In the embodiment, the number of times of the switching is determined according to the period of time of the switching stop period so that a period of time obtained by summing the period of time of the switching stop period and the period of time of the switching period of the FET1 is the same even when the state of the load changes.

Processing step of Step S809 is the same as the processing step of Step S608 of FIG. 7 in the second embodiment, and description thereof is therefore omitted. In Step S810, the power supply controller 201 outputs the control signal DS1, and determines whether or not the FET1 has performed the switching operation the number of times determined through the processing step of Step S808. When the power supply controller 201 determines that the FET1 has performed the switching operation the number of times determined through the processing step of Step S808, the power supply controller 201 returns the processing to Step S804. When the power supply controller 201 determines that the FET1 has not performed the switching operation the number of times determined through the processing step of Step S808, the power supply controller 201 returns the processing to Step S808. Subsequently, the power supply controller 201 repeats the processing steps of from Step S804 to Step S810, to thereby control the switching operation of the FET1 so that the output voltage Vout in accordance with the load connected to the power supply apparatus is output.

[Switching Operation of Switching Power Supply Apparatus]

Figure 10A:
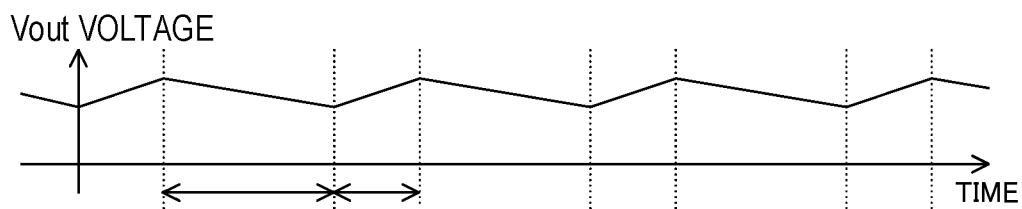
FIG. 10A, FIG. 10B, FIG. 10C, FIG. 10D, FIG. 10E, and FIG. 10F are graphs for showing the voltage waveforms of the switching power supply apparatus in the third embodiment.
Figure 10B:
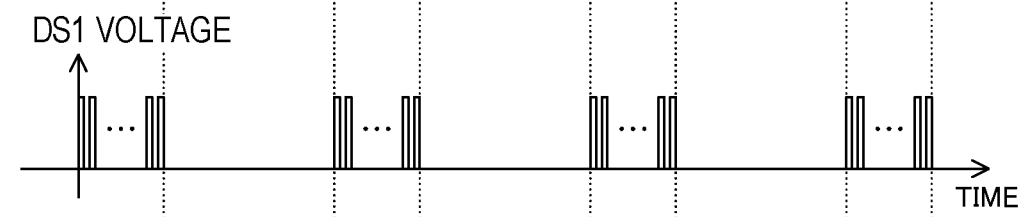
Figure 10C:
Figure 10D:
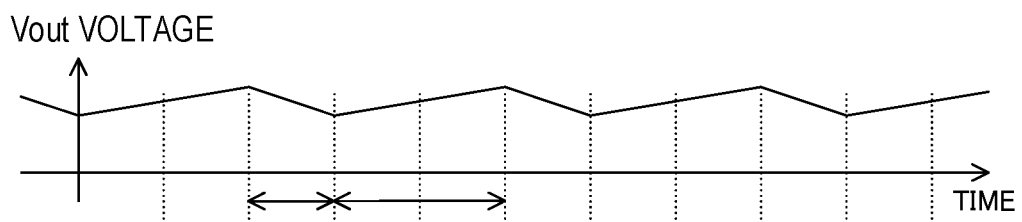
Figure 10E:
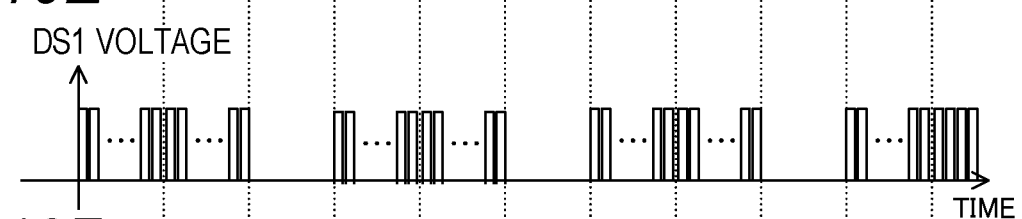
Figure 10F:
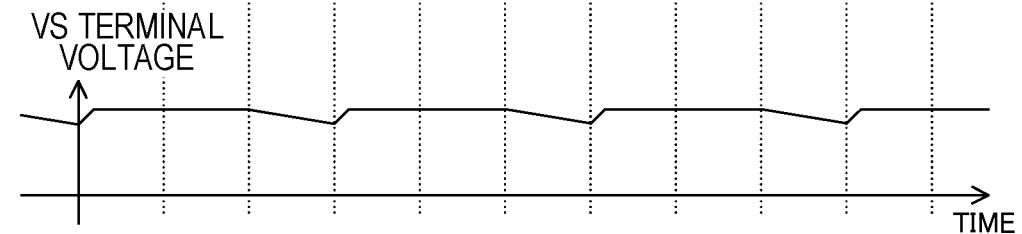

FIG. 10A, FIG. 10B, FIG. 10C, FIG. 10D, FIG. 10E, and FIG. 10F are graphs for showing voltage waveforms and signal waveforms in the switching power supply apparatus 200. FIG. 10A, FIG. 10B, and FIG. 10C are graphs for showing the voltage waveforms and the signal waveform when the load connected to the power supply apparatus is low. FIG. 10A shows the voltage waveform of the output voltage Vout. FIG. 10B shows the signal waveform (voltage waveform) of the control signal DS1. FIG. 10C shows the voltage waveform of the VS terminal voltage input to the VS terminal. Meanwhile, FIG. 10D, FIG. 10E, and FIG. 10F are graphs for showing the voltage waveforms and the signal waveform when the load connected to the power supply apparatus is high. FIG. 10D shows the voltage waveform of the output voltage Vout. FIG. 10E shows the signal waveform (voltage waveform) of the control signal DS1. FIG. 10F shows the voltage waveform of the VS terminal voltage input to the VS terminal. Vertical axes of FIG. 10A to FIG. 10F each indicate the voltage, and horizontal axes thereof each indicate the time. Also, in the embodiment, as in the first embodiment and the second embodiment, the power supply controller 201 performs the following intermittent switching control in order to increase the power supply efficiency. That is, the power supply controller 201 performs the intermittent switching control of repeating the stop period (periods 900 and 902) in which the FET1 stops the switching operation and the switching period (periods 901 and 903) in which the FET1 performs the switching operation.

In the embodiment, the number of times of the switching of the FET1 is changed according to the period of time of the switching stop period in the above-mentioned processing step of Step S808 of FIG. 9. Specifically, a period of time (hereinafter referred to as "burst cycle") obtained by summing the period of time of the switching stop period of the FET1 and the period of time of the switching period of the FET1 is maintained constant even when the state of the load connected to the power supply apparatus fluctuates. Thus, in the embodiment, the period of time of the switching period is determined according to the period of time of the switching stop period so that the burst cycle is constant, and the number of times of the switching of the FET1 is determined according to the period of time of the switching period. As a result, the burst cycle can be maintained constant so that the burst cycle does not decrease.

In general, when a frequency component of a multiple of a burst frequency being a reciprocal of the burst cycle approaches a resonance frequency of the transformer T1, the frequency component is sensed as high-frequency sound by a human. In general, a frequency component of a multiple of a frequency has higher energy as a multiplication rate decreases, and when a frequency component having a lower multiplication rate approaches the resonance frequency of the transformer T1, the occurring sound also increases. Meanwhile, when the load connected to the power supply apparatus increases, the burst cycle decreases, and the burst frequency increases. Thus, in the embodiment, the switching control for the FET1 is performed so that the burst cycle is constant even when the load increases. As a result, the burst frequency does not approach the resonance frequency of the transformer T1, and the occurrence of the high-frequency sound can be suppressed.

(Switching Operation for Low Load)

With reference to FIG. 10A, FIG. 10 B, and FIG. 10C, the operation of the switching power supply apparatus 200 when the load on the secondary side is low is described. The period 900 of FIG. 10B is the switching stop period of the FET1, and the control signal DS1 is at the low level (state in which the control signal DS1 is not output) as shown in FIG. 10B. The power supply to the secondary side and the auxiliary coil P2 of the transformer T1 is not performed in the switching stop period of the FET1, and hence the output voltage Vout gradually decreases as shown in FIG. 10A, and the VS terminal voltage of the power supply controller 201 also decreases as shown in FIG. 10C.

The period 901 of FIG. 10B is the switching operation period of the FET1, and the control signal DS1 has a PWM waveform of FIG. 10B, and each period corresponding to the high level in the one cycle of the control signal DS1 indicates the On-Duty. As shown in FIG. 10A, in the period 701, the output voltage Vout gradually increases, and the VS terminal voltage increases up to a voltage corresponding to the magnitude of the DC voltage Vin as shown in FIG. 10C.

The On-Duty of the control signal DS1 in the period 901 is determined through the processing step of Step S807 of FIG. 9. In the embodiment, the On-Duty of the control signal DS1 is determined based on the period of time of the switching stop period of the FET1 and the acquired VS terminal voltage. Moreover, in the processing step of Step S809 of FIG. 9, in order to maintain the burst cycle constant, the period of time obtained by subtracting the period of time of the switching stop period from the burst cycle is set to the period of time of the switching period, and the number of times of the switching of the FET1 is determined according to the period of time of the switching period. As a result, high electric power can be supplied to the load in the switching period of the FET1. Further, the burst frequency does not approach the resonance frequency of the transformer T1, and hence the occurrence of the high-frequency sound can be suppressed.

(Switching Operation for High Load)

Next, with reference to FIG. 10D, FIG. 10E, and FIG. 10F, the operation of the switching power supply apparatus 200 when the load on the secondary side is high is described. The period 902 of FIG. 10E is the switching stop period of the FET1, and the control signal DS1 is at the low level as shown in FIG. 10E. Moreover, in the switching stop period of the FET1, as shown in FIG. 10D and FIG. 10F, the output voltage Vout and the VS terminal voltage gradually decrease. The load on the secondary side (load connected to the power supply apparatus) is high, and hence, as shown in FIG. 10E, the period 902 is shorter than the period 900 in the case of the low load shown in FIG. 10B. The power supply controller 201 uses the period of time of the switching stop period and the voltage decrease per unit time of the VS terminal voltage to correct the VS terminal voltage acquired at the end time of the switching stop period, to thereby estimate the DC voltage Vin.

The period 903 of FIG. 10E is the switching operation period of the FET1, and the control signal DS1 has a PWM waveform of FIG. 10E, and each period corresponding to the high level in the one cycle of the control signal DS1 indicates the On-Duty. As shown in FIG. 10D, in the period 903, the output voltage Vout gradually increases, and the VS terminal voltage increases up to a voltage corresponding to the magnitude of the DC voltage Vin as shown in FIG. 10F. The total (burst cycle) of the times of the period 902 and the period 903 of FIG. 10E is the same as the total (burst cycle) of the times of the above-mentioned period 900 and period 901 of FIG. 10B.

The On-Duty of the control signal DS1 in the period 903 is determined through the processing step of Step S807 of FIG. 9. In the embodiment, the On-Duty of the control signal DS1 is determined based on the period of time of the switching stop period of the FET1 and the acquired VS terminal voltage. Moreover, in the processing step of Step S809 of FIG. 9, in order to maintain the burst cycle constant, the period of time obtained by subtracting the period of time of the switching stop period from the burst cycle is set to the period of time of the switching period, and the number of times of the switching of the FET1 is determined according to the period of time of the switching period. As a result, high electric power can be supplied to the load in the switching period of the FET1. Further, the burst frequency does not approach the resonance frequency of the transformer T1, and hence the occurrence of the high-frequency sound can be suppressed.

In the embodiment, there is described the method of performing the intermittent switching control so that the burst cycle is constant, and does not fluctuate even when the load connected to the power supply apparatus increases. For example, the high load may be addressed by control different from the method in the embodiment such as control of extending the period of time of the switching period such that the period of time of the switching period is longer than the reduced period of time of the switching stop period as the load increases, to thereby increase the burst cycle. Moreover, the time of the period 902 being the switching stop period in the case of the high load is shorter than the time of the period 900 in the case of the low load, and hence a predicted value of the load on the secondary side is high, with the result that the control signal DS1 is set to have a higher On-Duty. As a result, even when the load connected to the power supply apparatus increases, sufficient power supply can be performed.

As described above, as in the above-mentioned first embodiment and second embodiment, it is possible to detect the current state of the load by measuring the switching stop period. In the embodiment, the cycle for suppressing the high-frequency sound is determined in advance, and the switching operation period and the switching stop period are allocated within this cycle, and the number of times of the switching of the FET1 is determined. Accordingly, the high-frequency sound can be suppressed independently of the load state by performing the control of changing the number of times of the switching of the FET1 in accordance with the measured period of time of the switching stop period, to thereby maintain the burst cycle constant.

As described above, according to the embodiment, the electric power can efficiently be supplied in accordance with the load state without adding a new circuit.

Fourth Embodiment

In the first embodiment to the third embodiment, the embodiments in which the present invention is applied to the switching power supply apparatus of the flyback type are described. In a fourth embodiment, an embodiment in which the present invention is applied to a switching power supply apparatus of an active-clamp type is described. The configuration of the printer 10 being the image forming apparatus in the embodiment is the same as that in the first embodiment, and description thereof is omitted by using the same reference symbols to describe the same apparatus.

[Configuration of Switching Power Supply Apparatus]

Figure 11:
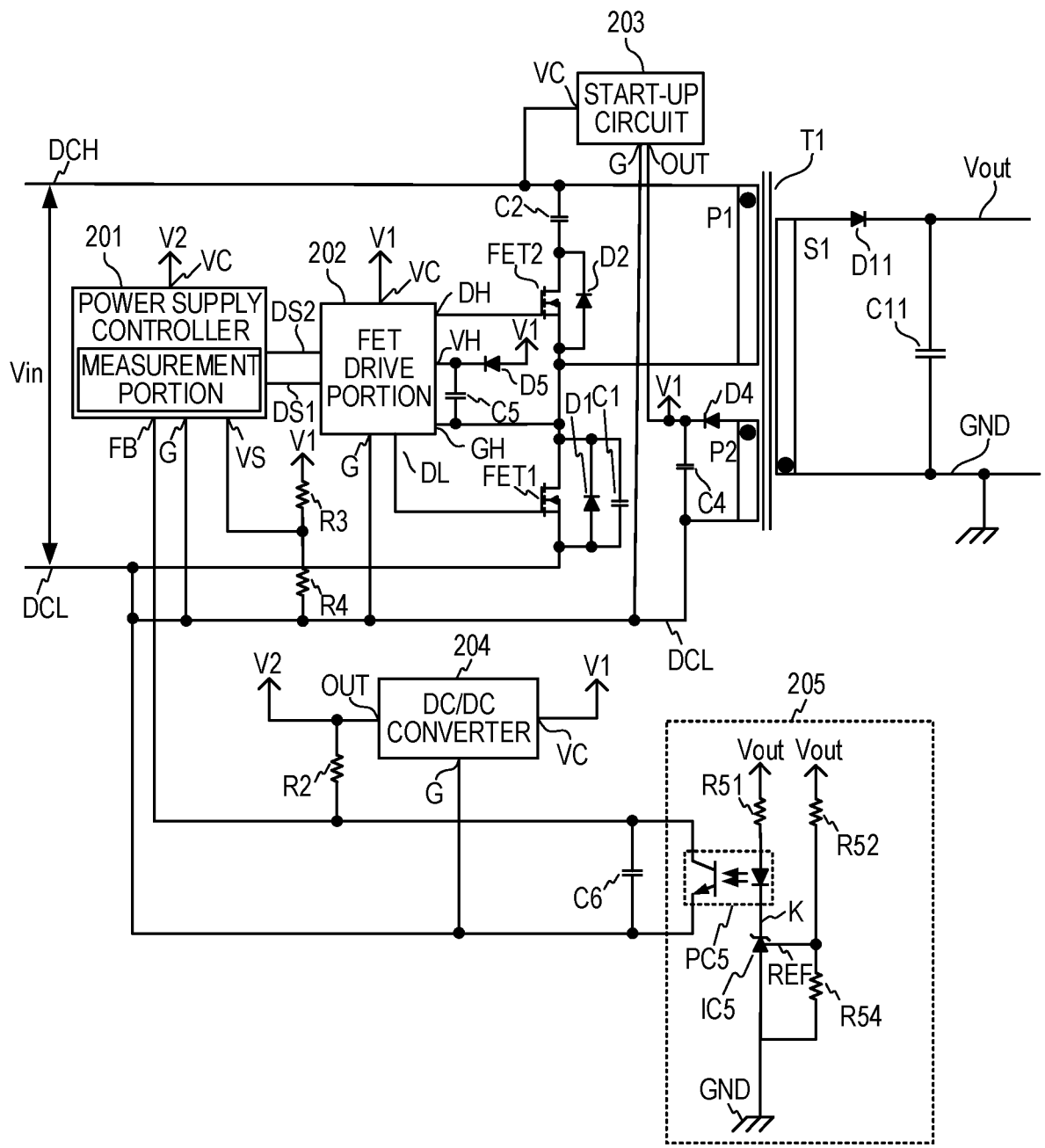
FIG. 11 is a circuit diagram for illustrating the circuit configuration of the switching power supply apparatus in the fourth embodiment.

FIG. 11 is a circuit diagram for illustrating the circuit configuration of the switching power supply apparatus 200 in the embodiment. The circuit diagram of FIG. 11 is different from the circuit diagram of FIG. 6 in the second embodiment in that the following circuits are added on the primary side of the transformer T1. That is, a circuit formed by serially connecting a capacitor C2 for voltage clamp and an FET2 being a second switching element to each other is connected in parallel to the primary coil P1 on the primary side of the switching power supply apparatus 200. Moreover, with the FET2 being added, circuits and signal lines for controlling the FET2 are added to the power supply controller 201 and the FET drive portion 202. Further, in order to reduce a loss at the time when the FET1 and the FET2 are switched off, a capacitor C1 for voltage resonance is connected in parallel to the FET1. Diodes D1 and D2 are body diodes of the FET1 and the FET2, respectively.

(Power Supply Controller)

The power supply controller 201 outputs a control signal DS2 for driving the FET2 in addition to the control signal DS1 for driving the FET1 based on the FB terminal voltage. The power supply controller 201 outputs the control signal DS1 to the FET drive portion 202, to thereby drive the FET1. After that, when the FET1 is brought into the OFF state, the power supply controller 201 outputs the control signal DS2 so that the FET2 is brought into an ON state after a dead time in which both of the FET1 and the FET2 are in the OFF state. After that, when the FET2 is brought into the OFF state, the power supply controller 201 outputs the control signal DS1 so that the FET1 is brought into the ON state again after the dead time. The other circuit configuration of the power supply controller 201 is the same as that of FIG. 6 in the second embodiment, and description of the same circuit components is herein omitted by using the same reference symbols to describe the same circuit components.

(FET Drive Portion)

The FET drive portion 202 generates drive signals DL and DH to be output to gate terminals of the FET1 and the FET2 in accordance with the control signals DS1 and DS2 output from the power supply controller 201, and outputs the drive signals DL and DH. Moreover, in order to drive the FET2, the power supply voltage is supplied to a VH terminal of the FET drive portion 202 by a charge pump circuit formed of a capacitor C5 and a diode D5.

The FET drive portion 202 sets the drive signal DL output to the gate terminal of the FET1 to the high level when the control signal DS1 is set to a high level, and the FET1 is consequently brought into the ON state. Meanwhile, the FET drive portion 202 sets the drive signal DH output to the gate terminal of the FET2 to a high level when the control signal DS2 is set to the high level, and the FET2 is consequently brought into the ON state. The other circuit configuration of the switching power supply apparatus 200 is the same as that of FIG. 6 in the second embodiment, and description of the same circuit components is herein omitted by using the same reference symbols to describe the same circuit components.

[Control Sequence of Power Supply Controller]

The power supply controller 201 performs the continuous switching operation in the print state of the printer 10, and performs the intermittent switching operation in the standby state or the sleep state of the printer 10 in the embodiment as in the first embodiment. The continuous switching operation and the intermittent switching operation are also the same as those in the first embodiment, and description thereof is therefore omitted.

Figure 12:
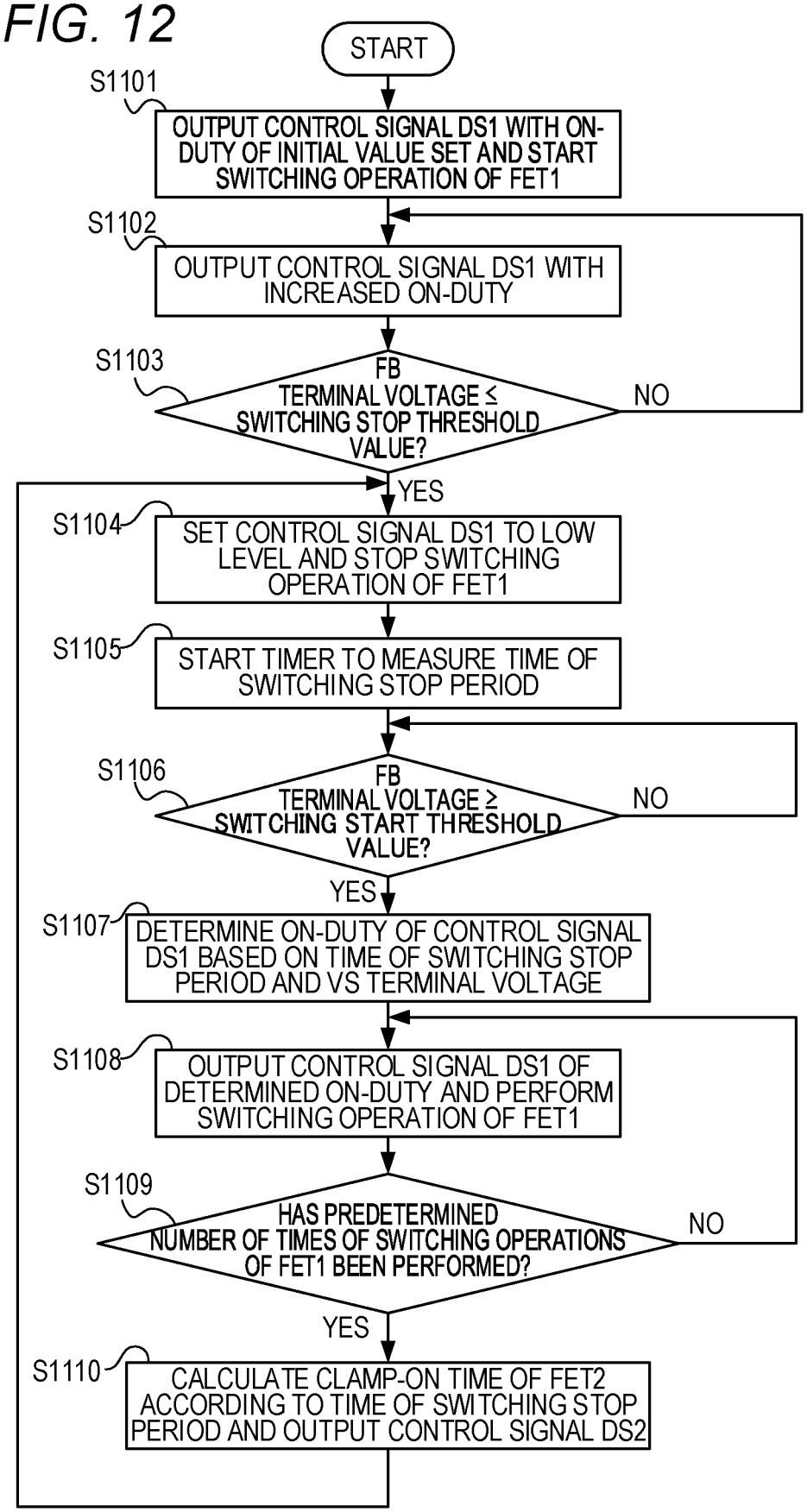
FIG. 12 is a flowchart for illustrating the switching control sequence of the power supply controller at the start and in the intermittent switching operation in the fourth embodiment.

FIG. 12 is a flowchart for illustrating the control sequence for the output voltage Vout by the power supply controller 201 at the startup and in the intermittent switching operation in the embodiment. Similar to FIG. 7 in the second embodiment, the processing of FIG. 12 is performed by the power supply controller 201 which is started up when the AC voltage is supplied from the commercial AC power supply 100 to the switching power supply apparatus 200, and the power supply voltage V2 is generated by the start-up circuit 203 and the DC/DC converter 204.

Processing steps of from Step S1101 to Step S1109 are the same as the processing steps of from Step S601 to Step S609 of FIG. 7 in the second embodiment, and description thereof is therefore omitted. In Step S1110, the power supply controller 201 calculates a time for turning on the clamp FET (FET2) based on the time information on the switching stop period acquired in Step S1107, and outputs the control signal DS2. After the power supply controller 201 outputs the control signal DS2, the power supply controller 201 returns the processing to Step S1104, and stops the switching operations of the FET1 and the FET2.

[Switching Operation of Switching Power Supply Apparatus]

Figure 13A:
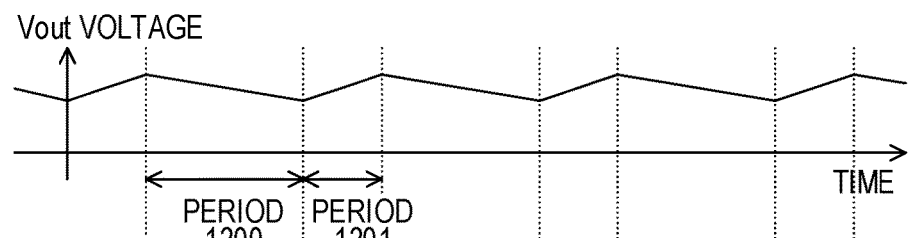
FIG. 13A, FIG. 13B, FIG. 13C, FIG. 13D, FIG. 13E, FIG. 13F, FIG. 13G, and FIG. 13H are graphs for showing the voltage waveforms of the switching power supply apparatus in the fourth embodiment.
Figure 13B:
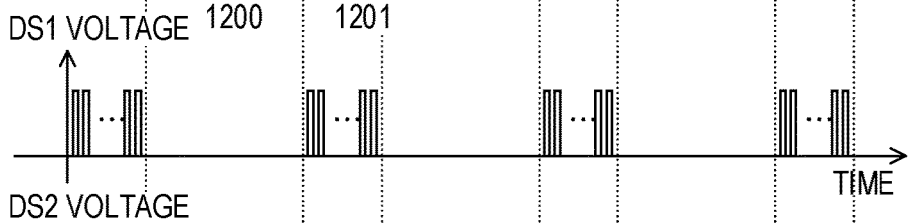
Figure 13C:
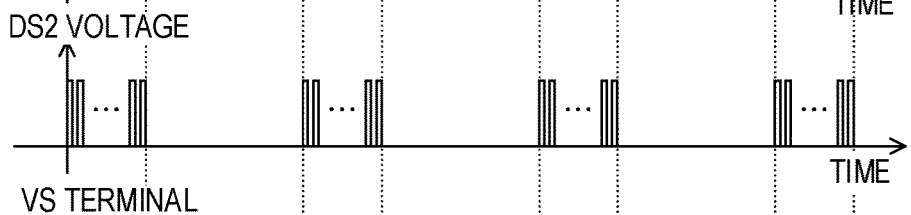
Figure 13D:
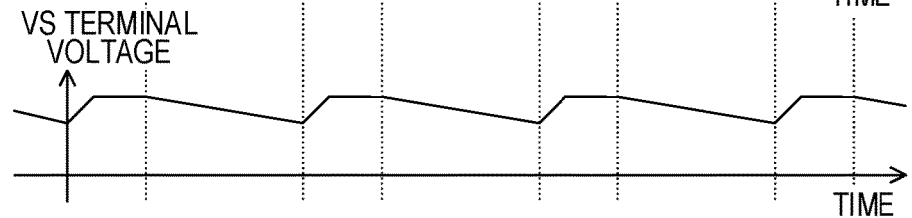
Figure 13E:
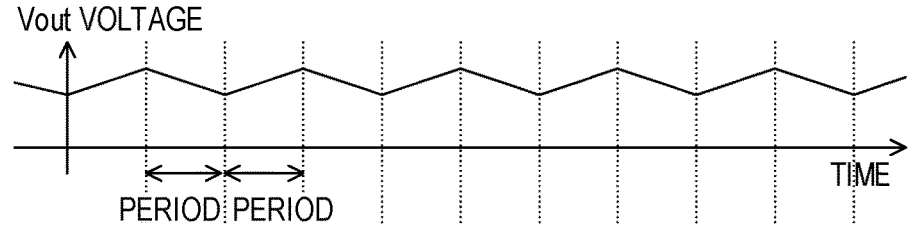
Figure 13F:
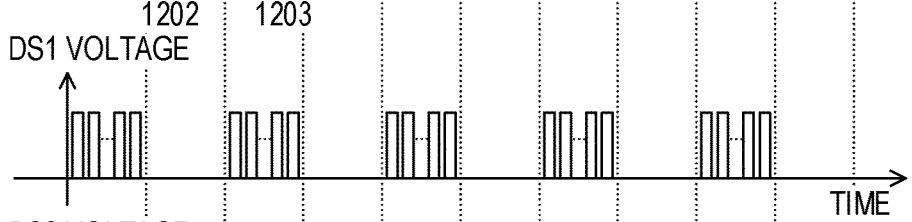
Figure 13G:
Figure 13H:
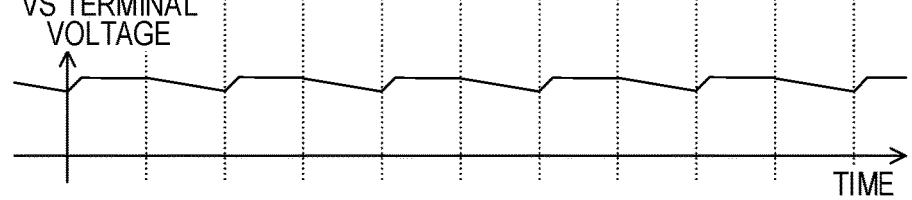

FIG. 13A, FIG. 13B, FIG. 13C, FIG. 13D, FIG. 13E, FIG. 13F, FIG. 13G, and FIG. 13H are graphs for showing voltage waveforms and signal waveforms in the switching power supply apparatus 200. FIG. 13A, FIG. 13B, FIG. 13C, and FIG. 13D are graphs for showing the voltage waveforms and signal waveforms when the load connected to the power supply apparatus is low. FIG. 13A shows the voltage waveform of the output voltage Vout. FIG. 13B shows the signal waveform (voltage waveform) of the control signal DS1. FIG. 13C shows the signal waveform (voltage waveform) of the control signal DS2. FIG. 13D shows the voltage waveform of the VS terminal voltage input to the VS terminal. Meanwhile, FIG. 13E, FIG. 13F, FIG. 13G, and FIG. 13H are graphs for showing the voltage waveforms and the signal waveforms when the load connected to the power supply apparatus is high. FIG. 13E shows the voltage waveform of the output voltage Vout. FIG. 13F shows the signal waveform (voltage waveform) of the control signal DS1. FIG. 13G shows the signal waveform (voltage waveform) of the control signal DS2. FIG. 13H shows the voltage waveform of the VS terminal voltage input to the VS terminal. Vertical axes of FIG. 13A to FIG. 13H each indicate the voltage, and horizontal axes thereof each indicate the time. Also, in the embodiment, as in the above-mentioned embodiments, the power supply controller 201 performs the following intermittent switching control in order to increase the power supply efficiency. That is, the power supply controller 201 performs the intermittent switching control of repeating the stop period (periods 1200 and 1202) in which the FET1 stops the switching operation and the switching period (periods 1201 and 1203) in which the FET1 performs the switching operation.

(Switching Operation for Low Load)

With reference to FIG. 13A, FIG. 13B, FIG. 13C, and FIG. 13D, the operation of the switching power supply apparatus 200 when the load on the secondary side is low is described. The period 1200 of FIG. 13B is the switching stop period of the FET1 and the FET2, and the control signals DS1 and DS2 are at a low level (state in which the control signals DS1 and DS2 are not output) as shown in FIG. 13B and FIG. 13C. The power supply to the secondary side and the auxiliary coil P2 of the transformer T1 is not performed in the switching stop period of the FET1 and the FET2, and hence the output voltage Vout gradually decreases as shown in FIG. 13A, and the VS terminal voltage of the power supply controller 201 also decreases as shown in FIG. 13D.

The period 1201 of FIG. 13B is the switching period of the FET1 and the FET2, and the control signals DS1 and DS2 have PWM waveforms of FIG. 13B and FIG. 13C, respectively, and each period corresponding to the high level in the one cycle of the control signals DS1 and DS2 indicates the On-Duty. As shown in FIG. 13A, in the period 1201, the output voltage Vout gradually increases, and the VS terminal voltage increases up to a voltage corresponding to the DC voltage Vin and maintains the same voltage in the switching periods of the FET1 and the FET2.

As shown in FIG. 13B and FIG. 13C, the control signal DS2 is first output in the switching period. In the active clamp method in the embodiment, there is performed control of turning on the clamp FET (FET2) for a short period at the end of the switching period, and then stopping. As a result, a sufficient voltage is charged in the clamp capacitor C2. Accordingly, at the start time of the switching period, there is provided such a state that the electric power can be supplied to the secondary side of the transformer T1 by only turning on the FET2. However, when not the FET2 but the FET1 is turned on first under this state, an excessive voltage is supplied to the clamp capacitor C2, which may cause failures of the FET1 and the FET2. Thus, in the embodiment, when the switching period starts, the FET2 is driven before the FET1.

After that, the control signals DS1 and DS2 alternately repeat the states of the high level and the low level through intermediation of dead time (not shown). After the switching operations of the FET1 and the FET2 are performed a predetermined number of times, the FET2 is set to the ON state by setting the control signal DS2 to the high level for a predetermined time, thereby being capable of causing a current to flow to the clamp capacitor C2 through the FET2. Thus, energy consumption can be reduced compared with a case in which the current is caused to flow through the body diode D2 of the FET2. After that, the FET2 is turned off before the direction of the current flowing through the FET2 changes to a direction from a drain terminal to a source terminal.

(Switching Operation for High Load)

With reference to FIG. 13E, FIG. 13F, FIG. 13G, and FIG. 13H, the operation of the switching power supply apparatus 200 when the load on the secondary side is high is described. The period 1202 of FIG. 13F is the switching stop period of the FET1 and the FET2, and the control signals DS1 and DS2 are at the low level (state in which the control signals DS1 and DS2 are not output) as shown in FIG. 13F and FIG. 13G. The power supply to the secondary side and the auxiliary coil P2 of the transformer T1 is not performed in the switching stop period of the FET1 and the FET2, and hence the output voltage Vout gradually decreases as shown in FIG. 13E, and the VS terminal voltage of the power supply controller 201 also decreases as shown in FIG. 13H.

The period 1203 of FIG. 13F is the switching period of the FET1 and the FET2, and the control signals DS1 and DS2 have PWM waveforms of FIG. 13F and FIG. 13G, respectively, and each period corresponding to the high level in the one cycle of the control signals DS1 and DS2 indicates the On-Duty. As shown in FIG. 13E, in the period 1203, the output voltage Vout gradually increases, and the VS terminal voltage increases up to the voltage corresponding to the DC voltage Vin and maintains the same voltage in the switching period of the FET1 and the FET2. As shown in FIG. 13F and FIG. 13G, after the control signal DS2 first reaches the high level, the control signals DS1 and DS2 alternately repeat the states of the high level and the low level through intermediation of the dead time (not shown). In this state, the time of the period 1202 is shorter than the time of the period 1200, and the control signal DS1 of FIG. 13F has a higher On-Duty. In the embodiment, the ratio of the On-Duty is increased by increasing the time of the high level of the control signal DS1. As a result, sufficiently large electric power can be supplied to the load on the secondary side (load connected to the power supply apparatus) in the switching period of the FET1 and the FET2, and the power supply having a high power supply efficiency can be performed independently of the load.

After that, the FET2 is set to the ON state by setting the control signal DS2 to the high level for the predetermined time after the switching operations of the FET1 and the FET2 are performed the predetermined number of times, thereby being capable of causing the current to flow to the clamp capacitor C2 through the FET2, and hence high efficiency is achieved. Further, when the last on-state time of the FET2 is changed in proportion to the On-Duty changed in accordance with the period of time of the switching stop period, the FET2 can be turned off immediately before the direction of the current flowing through the FET2 changes to the direction from the drain terminal to the source terminal even when the load on the secondary side fluctuates.

As described above, in the switching power supply apparatus of the active clamp type in the embodiment, the load state is detected by measuring the switching stop period in the intermittent switching operation. Moreover, the power supply having the high power supply efficiency can be achieved by changing the switching control for the FET1 and the FET2 in accordance with the detected load state. Further, the power supply efficiency can be increased more by changing the on-state time of the clamp FET (FET2) at the end of the switching period in accordance with the detected load state to perform the switching operation of the FET2 in the intermittent switching operation.

Also, in the embodiment, as in the second embodiment, it is possible to determine the optimal on-state time of the FET1 in the switching period in accordance with the DC voltage Vin by estimating the DC voltage Vin based on the acquired VS terminal voltage. Moreover, the power supply amount from the primary side to the secondary side of the transformer is determined based on the product of the DC voltage Vin and the on-state time of the FET1, and hence efficient power supply can be achieved by determining the on-state time of the FET1 such that the product of the DC voltage Vin and the on-state time of the FET1 is constant.

In the embodiment, the On-Duty of the control signal DS1 is changed in accordance with the period of time of the switching stop period, but the configuration is not limited to the example, and the power supply efficiency can be maintained also by increasing the on-state time of the FET1 in accordance with the period of time of the switching stop period. Moreover, the on-state time of the control signal DS2 may be reduced in accordance with the period of time of the switching stop period.

As described above, according to the embodiment, the electric power can efficiently be supplied in accordance with the load state without adding a new circuit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-107930, filed Jun. 29, 2021, which is hereby incorporated by reference herein in its entirety.

What is claimed is:

1. A power supply apparatus, comprising:
   a transformer including a primary coil, a secondary coil, and an auxiliary coil;
   a switching element configured to supply or cut off electric power to the primary coil by a switching operation;
   a control unit configured to control the switching operation;

a feedback unit configured to feed back a voltage output from the secondary coil; a first rectifying/smoothing portion configured to rectify and smooth an AC voltage input to the first rectifying/smoothing portion, and to output a rectified and smoothed voltage to the primary coil;

a second rectifying/smoothing portion configured to rectify and smooth a voltage induced on the auxiliary coil; and a voltage divider which includes a voltage divider resistor, and is configured to divide a voltage output from the second rectifying/smoothing portion by the voltage divider resistor, and to output a voltage to the control unit, wherein the control unit is configured to perform an intermittent control of repeating a switching period for performing the switching operation and a stop period for stopping the switching operation, wherein the control unit includes a measurement portion configured to measure a length of the stop period, wherein in the switching period, when the control unit performs the switching operation of the switching element a predetermined number of times, the switching period is transitioned to the stop period, and in the stop period, when the control unit determines, based on a voltage output from the feedback unit, that the voltage output from the secondary coil falls below a target voltage, the stop period is transitioned to the switching period, wherein the control unit is configured to change the switching operation of the switching element in the switching period based on the length of the stop period measured by the measurement portion, and wherein the control unit is configured to estimate a voltage value of the AC voltage based on an output voltage of the voltage divider, the length of the stop period, a voltage drop per unit time of the second rectifying/smoothing portion in the stop period, a division ratio of the voltage divider, and a ratio of number of turns between a number of turns of the primary coil and a number of turns of the auxiliary coil.

2. The power supply apparatus according to claim 1, wherein in a case in which the voltage output from the secondary coil is higher than the target voltage, the feedback unit is configured to output, to the control unit, a first feedback voltage for causing the control unit to stop the switching operation, and in a case in which the voltage output from the secondary coil is lower than the target voltage, the feedback unit is configured to output, to the control unit, a second feedback voltage for causing the control unit to start the switching operation, the second feedback voltage being higher than the first feedback voltage.

3. The power supply apparatus according to claim 1, wherein the control unit is configured to change an On-Duty of the switching element in a switching cycle of the switching element in accordance with the length of the stop period while maintaining the switching cycle of the switching element at a predetermined cycle.

4. The power supply apparatus according to claim 1, wherein the control unit is configured to change a switching cycle of the switching element in accordance with the length of the stop period while maintaining an On-Duty in the switching cycle of the switching element at a predetermined value.

5. The power supply apparatus according to claim 1, wherein the control unit is configured to increase an On-Duty in a switching cycle of the switching element as the stop period decreases.

6. The power supply apparatus according to claim 1, wherein the control unit is configured to estimate the voltage value of the AC voltage based on the output voltage of the voltage divider at a start time of the stop period.

7. The power supply apparatus according to claim 6, wherein the control unit is configured to calculate the output voltage of the voltage divider at the start time of the stop period by adding a product of the length of the stop period and the voltage drop per unit time in the stop period to an output voltage of the voltage divider obtained at an end time of the stop period.

8. The power supply apparatus according to claim 7, wherein the control unit is configured to determine an On-Duty of the switching element in a switching cycle so that a product of the estimated voltage value of the AC voltage and a period of time in which the switching element is turned on in the switching cycle is constant.

9. The power supply apparatus according to claim 8, wherein the control unit is configured to vary a length of the switching period in accordance with the length of the stop period so that a sum of the length of the switching period and the length of the stop period is a constant period of time, and to change a number of times of the switching operation of the switching element in the switching period in accordance with the varied length of the switching period.

10. The power supply apparatus according to claim 9, wherein a frequency component of a multiple of a frequency being a reciprocal of a period of time obtained by summing the length of the switching period and the length of the stop period is apart from a resonance frequency of the transformer.

11. The power supply apparatus according to claim 1, wherein the switching element is a first switching element, the power supply apparatus further comprising:

a second switching element which is connected in parallel to the primary coil of the transformer and is configured to be controlled by the control unit; and a capacitor which is connected in series to the second switching element, and is connected, together with the second switching element, in parallel to the primary coil of the transformer, wherein in the switching period, the control unit is configured to perform the switching operation of alternately turning on or off the first switching element and the second switching element through intermediation of a dead time in which both of the first switching element and the second switching element are turned off, and in the stop period, the control unit is configured to stop the switching operation, and wherein in a transition from the switching period to the stop period, the control unit is configured to turn on the second switching element and then transition to the stop period, and also in a transition from the stop period to the switching period, the control unit is configured to turn on the second switching element and then transition to the switching period.

12. The power supply apparatus according to claim 11, wherein the control unit is configured to determine a time for turning on the second switching element in the transition from the switching period to the stop period based on the length of the stop period.

13. An image forming apparatus, comprising:
an image forming portion configured to form an image on a recording material;
a controller configured to control the image forming portion; and
a power supply apparatus configured to supply electric power to the image forming portion and the controller,
wherein the controller is configured to control the image forming portion to be switchable among a print state for forming the image on the recording material, a standby state of being ready to transition to the print state, and a sleep state for reducing power consumption, and
wherein the power supply apparatus includes:
   a transformer including a primary coil, a secondary coil, and an auxiliary coil;
   a switching element configured to supply or cut off electric power to the primary coil by a switching operation;
   a control unit configured to control the switching operation; [and]
   a feedback unit configured to feed back a voltage output from the secondary coil;
   a first rectifying/smoothing portion configured to rectify and smooth an AC voltage input to the first rectifying/smoothing portion, and to output a rectified and smoothed voltage to the primary coil;
   a second rectifying/smoothing portion configured to rectify and smooth a voltage induced on the auxiliary coil; and
   a voltage divider which includes a voltage divider resistor, and is configured to divide a voltage output from the second rectifying/smoothing portion by the voltage divider resistor, and to output a voltage to the control unit,
wherein the control unit is configured to perform an intermittent control of repeating a switching period for performing the switching operation and a stop period for stopping the switching operation,
wherein the control unit includes a measurement portion configured to measure a length of the stop period,
wherein in the switching period, when the control unit performs the switching operation of the switching element a predetermined number of times, the switching period is transitioned to the stop period, and in the stop period, when the control unit determines, based on a voltage output from the feedback unit, that the voltage output from the secondary coil falls below a target voltage, the stop period is transitioned to the switching period,
wherein the control unit is configured to change the switching operation of the switching element in the switching period based on the length of the stop period measured by the measurement portion, and
wherein the control unit is configured to estimate a voltage value of the AC voltage based on an output voltage of the voltage divider, the length of the stop period, a voltage drop per unit time of the second rectifying/smoothing portion in the stop period, a division ratio of the voltage divider, and a ratio of number of turns between a number of turns of the primary coil and a number of turns of the auxiliary coil.

14. The image forming apparatus according to claim 13, wherein in a case in which the voltage output from the secondary coil is higher than the target voltage, the feedback unit is configured to output, to the control unit, a first feedback voltage for causing the control unit to stop the switching operation, and in a case in which the voltage output from the secondary coil is lower than the target voltage, the feedback unit is configured to output, to the control unit, a second feedback voltage for causing the control unit to start the switching operation, the second feedback voltage being higher than the first feedback voltage.

15. The image forming apparatus according to claim 13, wherein the control unit is configured to change an On-Duty of the switching element in a switching cycle of the switching element in accordance with the length of the stop period while maintaining the switching cycle of the switching element at a predetermined cycle.

16. The image forming apparatus according to claim 13, wherein the control unit is configured to change a switching cycle of the switching element in accordance with the length of the stop period while maintaining an On-Duty in the switching cycle of the switching element at a predetermined value.

17. The image forming apparatus according to claim 13, wherein the control unit is configured to increase an On-Duty of the switching element in a switching cycle as the stop period decreases.

18. The image forming apparatus according to claim 13, wherein the switching element is a first switching element, the power supply apparatus further comprising:
   a second switching element which is connected in parallel to the primary coil of the transformer and is configured to be controlled by the control unit; and
   a capacitor which is connected in series to the second switching element, and is connected, together with the second switching element, in parallel to the primary coil of the transformer,
wherein in the switching period, the control unit is configured to perform the switching operation of alternately turning on or off the first switching element and the second switching element through intermediation of a dead time in which both of the first switching element and the second switching element are turned off, and in the stop period, the control unit is configured to stop the switching operation, and
wherein in a transition from the switching period to the stop period, the control unit is configured to turn on the second switching element and then transition to the stop period, and also in a transition from the stop period to the switching period, the control unit is configured to turn on the second switching element and then transition to the switching period.

19. The image forming apparatus according to claim 18, wherein the control unit is configured to determine a time for turning on the second switching element in the transition from the switching period to the stop period based on the length of the stop period.

* * * * *